US 11,403,891 B2

United States Patent
Nee

(10) Patent No.: US 11,403,891 B2
(45) Date of Patent: Aug. 2, 2022

(54) AUTONOMOUS SETUP AND TAKEDOWN OF CALIBRATION ENVIRONMENT FOR VEHICLE SENSOR CALIBRATION

(71) Applicant: GM Cruise Holdings LLC, San Francisco, CA (US)

(72) Inventor: James Matthew Nee, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 326 days.

(21) Appl. No.: 16/672,134

(22) Filed: Nov. 1, 2019

(65) Prior Publication Data
US 2021/0134079 A1 May 6, 2021

(51) Int. Cl.
| | |
|---|---|
| *G07C 5/08* | (2006.01) |
| *G07C 5/02* | (2006.01) |
| *G05D 1/02* | (2020.01) |
| *G05D 1/00* | (2006.01) |
| *B65G 47/80* | (2006.01) |

(52) U.S. Cl.
CPC ............... *G07C 5/08* (2013.01); *B65G 47/80* (2013.01); *G05D 1/0088* (2013.01); *G05D 1/0287* (2013.01); *G07C 5/02* (2013.01)

(58) Field of Classification Search
CPC . G07C 5/08; G07C 5/02; B65G 47/80; G05D 1/0088; G05D 1/0287
USPC ........................................................ 701/33.1
See application file for complete search history.

(56) References Cited

U.S. PATENT DOCUMENTS

| | | | | |
|---|---|---|---|---|
| 2006/0087273 | A1* | 4/2006 | Ko | A47L 9/2884 |
| | | | | 318/568.12 |
| 2010/0161125 | A1* | 6/2010 | Aoba | B25J 9/1692 |
| | | | | 700/254 |
| 2017/0343654 | A1* | 11/2017 | Valois | G01S 17/931 |
| 2018/0178378 | A1* | 6/2018 | Hagino | B25J 9/103 |
| 2018/0305122 | A1* | 10/2018 | Moulin | B65G 1/02 |
| 2019/0056483 | A1* | 2/2019 | Bradley | G01S 7/4972 |
| 2019/0056484 | A1* | 2/2019 | Bradley | G01S 7/4815 |
| 2019/0204425 | A1* | 7/2019 | Abari | G01S 13/931 |
| 2019/0204427 | A1* | 7/2019 | Abari | G01S 17/931 |
| 2019/0331482 | A1* | 10/2019 | Lawrence | G01S 7/4086 |
| 2019/0339714 | A1* | 11/2019 | Kwak | G05D 1/0255 |
| 2019/0369641 | A1* | 12/2019 | Gillett | A63F 9/24 |
| 2020/0342627 | A1* | 10/2020 | Wang | G06T 7/80 |

(Continued)

OTHER PUBLICATIONS

Taehyeong et al., "Calibration Method Between Dual 3D Lidar Sensors for Autonomous Vehicles," 2017, Publisher: IEEE.*

(Continued)

*Primary Examiner* — Tuan C To
(74) *Attorney, Agent, or Firm* — Polsinelli, PC

(57) ABSTRACT

A computing device receives a setup command and signals mobile robots to move sensor targets into positions within a predetermined range of a turntable. Each mobile robot may be coupled to a sensor target. Once the sensor targets are moved into the positions, calibration may be initiated, in which a vehicle is rotated using the turntable, and sensors coupled to the vehicle are calibrated based on detection of the sensor targets. The computing device may signal the mobile robots to adjust the sensor targets as needed, or, after calibration, to move into storage or charging positions.

19 Claims, 23 Drawing Sheets

(56) References Cited

U.S. PATENT DOCUMENTS

2021/0051317 A1\* 2/2021 Yan ..................... H04N 17/002

OTHER PUBLICATIONS

K.R.S. Kodagoda et al., "Sensor Registration and Calibration using Moving Targets," 2006, Publisher: IEEE.\*
Bu-hong et al., "Array Calibration for Radar Low-Angle Tracking Based on Electromagnetic Matched Field Processing," 2008, Publisher: IEEE.\*

\* cited by examiner

Dynamic Scene Calibration Environment 500

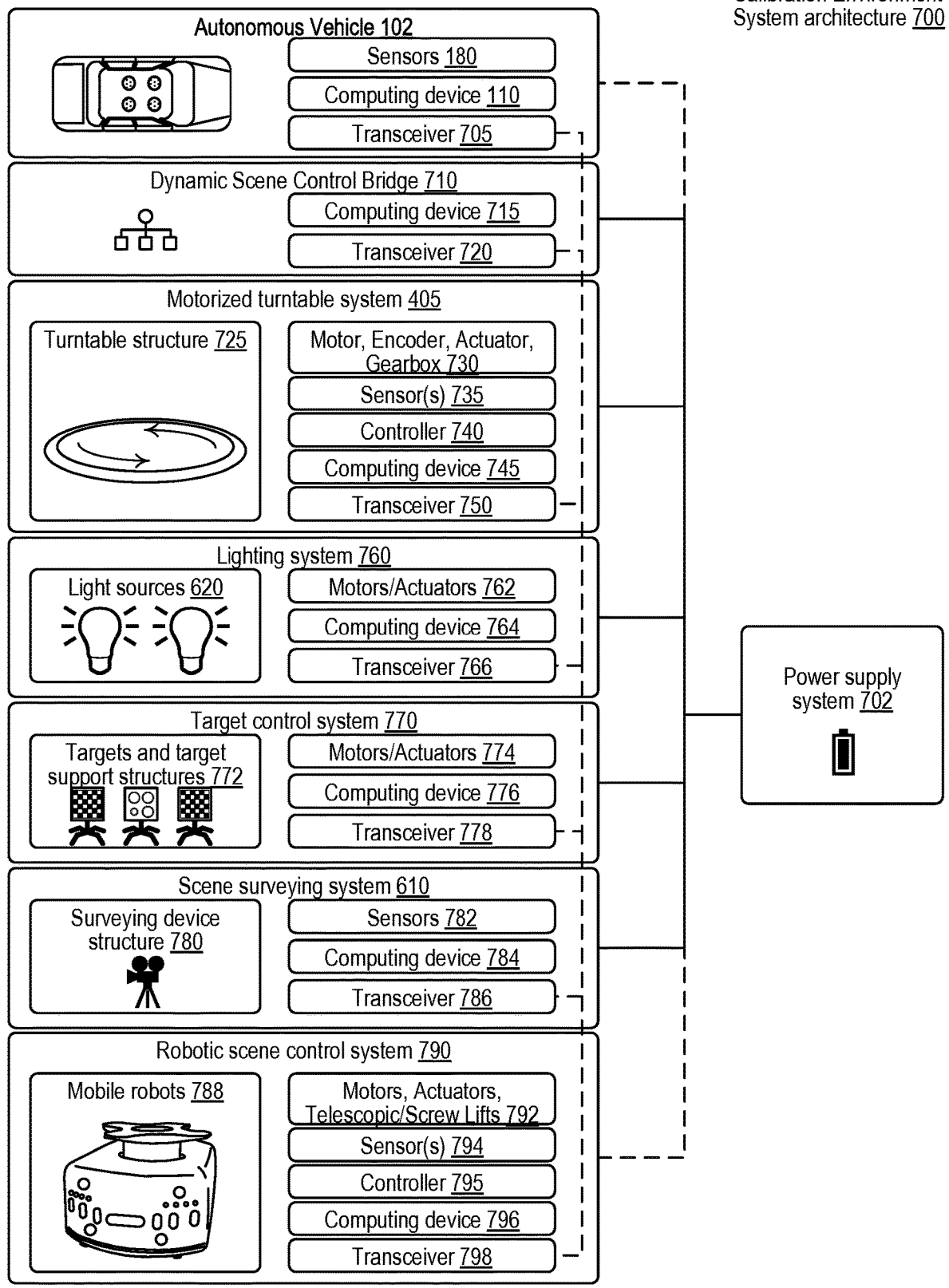

*FIG. 9A*   *FIG. 9B*   *FIG. 9C*
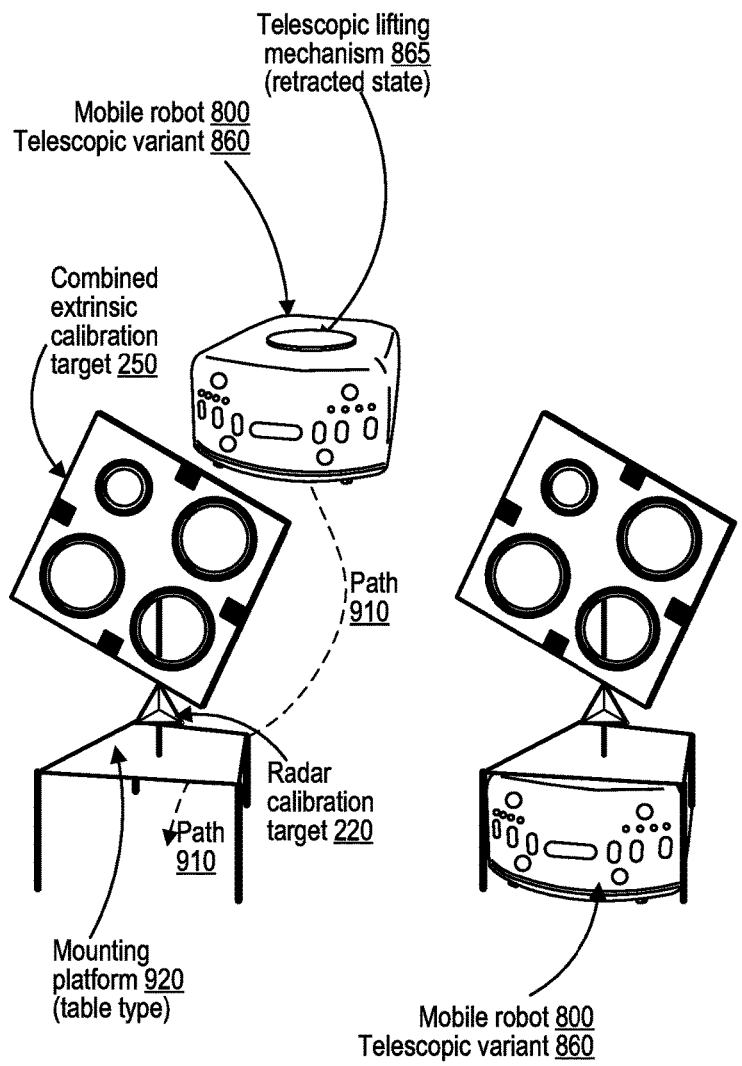
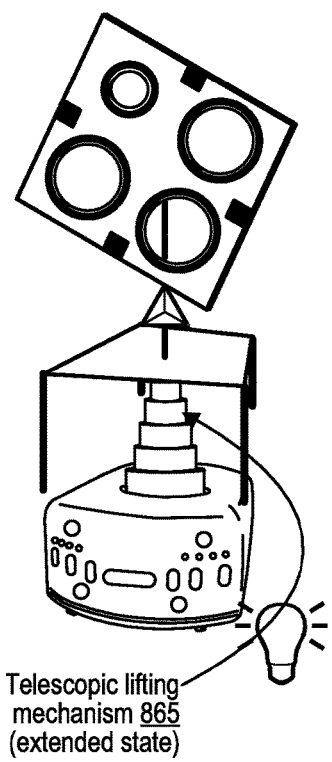

AUTONOMOUS SETUP AND TAKEDOWN OF CALIBRATION ENVIRONMENT FOR VEHICLE SENSOR CALIBRATION

TECHNICAL FIELD

The present invention generally pertains to calibration of sensors that are used by vehicles. More specifically, the present invention pertains to use of robotic devices to autonomously set up and take down a calibration environment that is used by a vehicle to perform calibrations of various sensors that are coupled to the vehicle and that are used by the vehicle to identify its surroundings.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others. The autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Similar sensors may also be mounted onto non-autonomous vehicles, for example onto vehicles whose sensor data is used to generate or update street maps.

A wide range of manufacturing defects or discrepancies can exist in vehicles, sensors, and mounting hardware that affixes the sensors to the vehicles. Because of these discrepancies, different sensors mounted to different vehicles may capture slightly different data, even when those vehicles are at the exact same position, and even when the vehicles are brand new. For example, a lens of one camera may be warped slightly (or include some other imperfection) compared to a lens of another camera, one vehicle may include a newer hardware revision or version of a particular sensor than another, one vehicle's roof may be a few millimeters higher or lower than another vehicle's roof, or a skewed screw used in a mounting structure for a sensor on one vehicle may tilt the mounting structure slightly. Such imperfections and variations in manufacturing can impact sensor readings and mean that there no two vehicles capture sensor readings in quite the same way, and thus no two vehicles interpret their surroundings via sensor readings in quite the same way. With use, vehicles can drift even further apart in their sensor readings due to exposure to the elements, for example through exposure to heat, rain, dust, frost, rocks, pollution, vehicular collisions, all of which can further damage or otherwise impact a vehicle or its sensor.

Sensors typically capture data and provide results in a standardized manner that does not, by itself, test or account for intrinsic properties of each sensor, such as the position and angle of the sensor or properties of a lens, or for extrinsic relationships between sensors that capture data from similar areas. Because of this, it can be unclear whether a discrepancy in measurements between two vehicles can be attributed to an actual difference in environment or simply different properties of vehicle sensors. Because autonomous vehicles are trusted with human lives, it is imperative that autonomous vehicles have as robust an understanding of their environments as possible, otherwise a vehicle might perform an action that it should not perform, or fail to perform an action that it should perform, either of which can result in a vehicular accident and put human lives at risk. Other sensor-laden vehicles, such as those that collect data for maps or street-level imagery, can produce unreliable maps or images if they cannot account for the properties of their sensors, which can then in turn confuse both human vehicles and autonomous vehicles that rely on those maps, again risking human life.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 7 illustrates a system architecture of an dynamic scene calibration environment.

FIG. 9A illustrates a mobile robot approaching a target stand.

FIG. 9B illustrates a mobile robot underneath a target stand.

FIG. 9C illustrates a mobile robot lifting a target stand vertically using a telescopic lifting mechanism.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements to vehicle sensor calibration technologies. Use of a dynamic calibration scene with an automated turntable or carousel system improves the functioning of sensor calibration by improving runtime-efficiency, space-efficiency, comprehensiveness of calibration, and consistency of vehicle sensor calibration. The described vehicle sensor calibration technologies ultimately transform vehicle sensors from an uncalibrated state to a calibrated state. The described vehicle sensor calibration technologies are implemented using a vehicle, the vehicle's sensors, a turntable and other potential components of a dynamic scene, one or more computing devices associated with the other components, each of which is integral at least one embodiment of the vehicle sensor calibration technologies.

A computing device may receive a setup command and signals mobile robots to move sensor targets into positions within a predetermined range of a turntable. Each mobile robot may be coupled to a sensor target. Once the sensor targets are moved into the positions, calibration may be initiated, in which a vehicle is rotated using the turntable, and sensors coupled to the vehicle are calibrated based on detection of the sensor targets. The computing device may signal the mobile robots to adjust the sensor targets as needed, or, after calibration, to move into storage or charging positions Sensors coupled to the vehicle may be calibrated using a dynamic scene with the sensor targets positioned around the turntable, the turntable motorized to rotate the vehicle to different orientations. The sensors capture data at each vehicle orientation along the rotation. The vehicle's computer identifies representations of the sensor targets within the data captured by the sensors, and calibrates the sensor based on these representations, for example by generating a transformation based on mapping positions of these representations in the data to known positions of the sensor targets, such as to correct lens distortion, the transformation applied to post-calibration sensor data.

Figure 1:
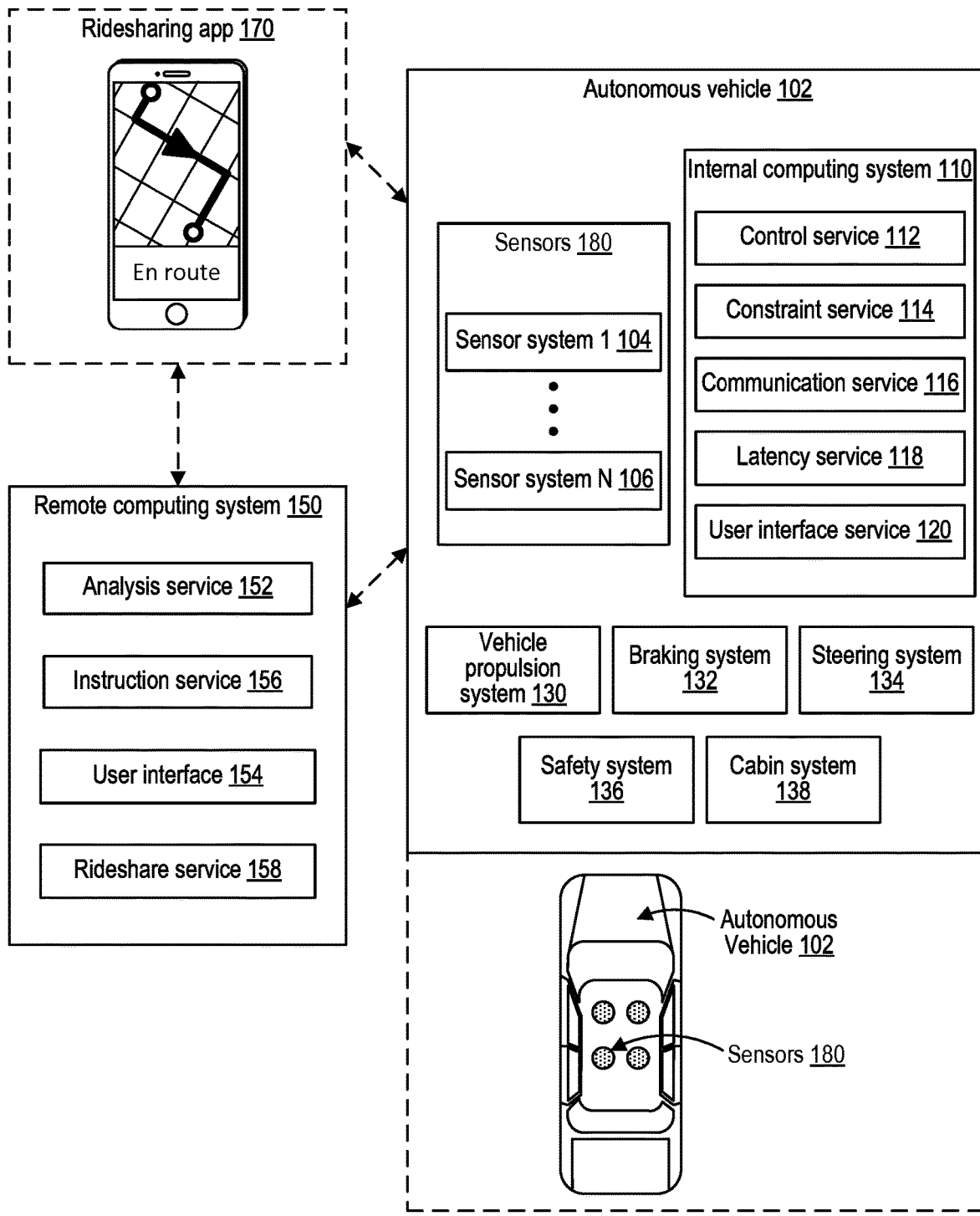
FIG. 1 illustrates an autonomous vehicle and remote computing system architecture.

FIG. 1 illustrates an autonomous vehicle and remote computing system architecture.

The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

Figure 18:
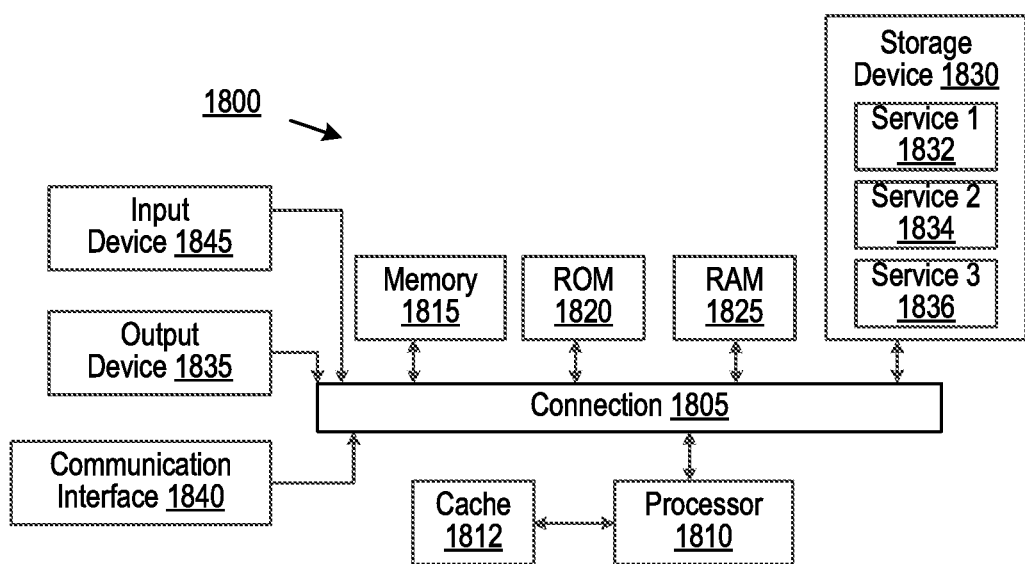
FIG. 18 shows an example of a system for implementing certain aspects of the present technology.

The internal computing system 110 can, in some cases, include at least one computing system 1800 as illustrated in or discussed with respect to FIG. 18, or may include at least a subset of the components illustrated in FIG. 18 or discussed with respect to computing system 1800.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

The remote computing system 150 can, in some cases, include at least one computing system 1800 as illustrated in or discussed with respect to FIG. 18, or may include at least a subset of the components illustrated in FIG. 18 or discussed with respect to computing system 1800.

Figure 2A:
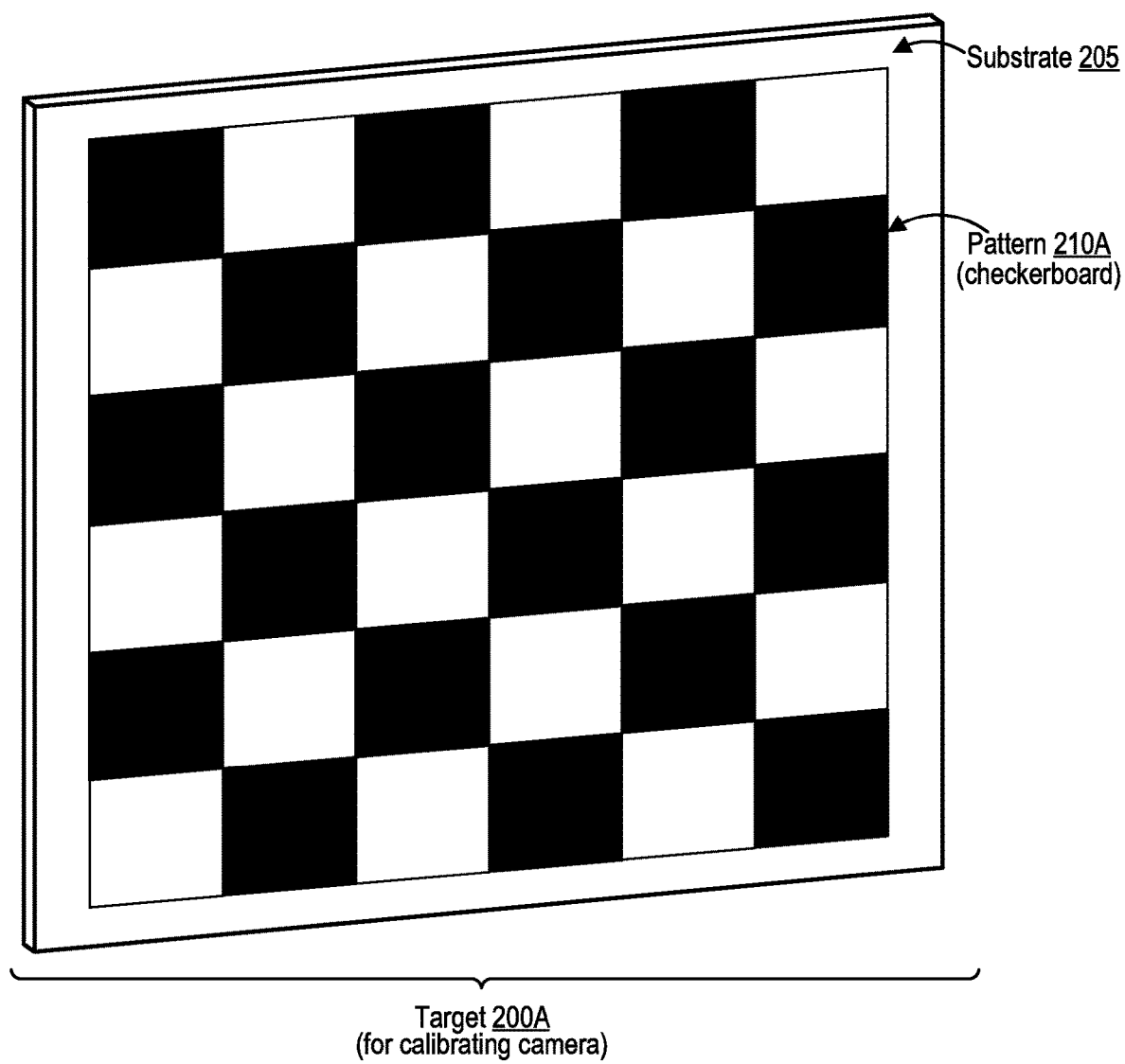
FIG. 2A illustrates a camera calibration target with a checkerboard pattern on a planar substrate.

FIG. 2A illustrates a camera calibration target with a checkerboard pattern on a planar substrate.

The sensor calibration target 220A illustrated in FIG. 2A is a planar board made from a substrate 205, with a pattern 210A printed, stamped, engraved, imprinted, or otherwise marked thereon. The pattern 210A of FIG. 2A is a checkerboard pattern. The substrate 205 may be paper, cardboard, plastic, metal, foam, or some combination thereof. The substrate 205 may in some cases include a translucent or transparent surface upon which the pattern 210A is printed, and which a light source may provide illumination through. The substrate 205 may in some cases include a retroreflective surface upon which the pattern 210A is printed. The retroreflective property of the surface may be inherent to the material of the substrate 205 or may be a separate layer applied to the surface of the substrate, for example by adhering a retroreflective material to the substrate 205 or by painting (e.g., via a brush, roller, or aerosol spray) the substrate 205 with a retroreflective paint. A reflective or retroreflective property may in some cases improve detection using radar, lidar, or other EmDAR sensors. The material and shape of the substrate 205 may also be selected such that the material and/or shape produces a high amount of acoustic resonance or acoustic response to improve detection using SONAR or SODAR sensors. In some cases, the substrate 205, and therefore the target 200A, may be concave, convex, otherwise curved, or some combination thereof. The substrate 205 may in some cases include devices, such as speakers, heat sources, or light sources, that allow improved detection by microphones, infrared sensors, or cameras, respectively.

The sensor calibration target 220A illustrated in FIG. 2A is useful for calibration of a camera of the vehicle, or other sensor that captures visual data. In particular, a camera with a pattern/image/feature recognition system running on computer system 110 can identify the checkerboard pattern 210A of FIG. 2A, and can identify points representing vertices between the dark (black) and light (white) checkers. By drawing lines connecting these points, the camera and computer system 110 can generate a grid. If the camera has a wide-angle lens, such as a fisheye lens or a barrel lens, the resulting grid will be warped so that some checkers will appear curved rather than straight, and so that checkers near the edges of the camera's point of view will appear more squashed, while checkers near the center of the camera's point of view will appear larger and more even. A rectilinear lens provides a similar, is opposite, effect. Based on prior knowledge of what the checkerboard pattern and resulting grid should look like, and its original dimensions, compared against what its representation looks like as captured by the camera, the camera and computing system 110 may identify the effect of the lens and counteract it. The camera and computing system 110 may also identify other parameters of the camera this way, such as position parameters (x, y, z, roll, pitch, yaw), any lens color to be filtered out, any crack or defect in the lens to be filtered out, or a combination thereof.

The sensor calibration target 220A illustrated in FIG. 2A is useful for detection by, and calibration of, a range sensor of the vehicle, such as a LIDAR, SONAR, SODAR, or radar sensor of the vehicle, at least in that the shape of the planar substrate 205 can be detected by the range sensor. For example, flat planar vision targets such as the target 220A can be detected by lidar by relying on planar geometry estimates and using the returned intensity. While FIG. 2A illustrates a square or rectangular substrate 205, the substrate 205 may be circular, semicircular, ellipsoidal, triangular, quadrilateral (trapezoid, parallelogram), pentagonal, hexagonal, heptagonal, octagonal, nonagonal, decagonal, otherwise polygonal, or some combination thereof.

Figure 2B:
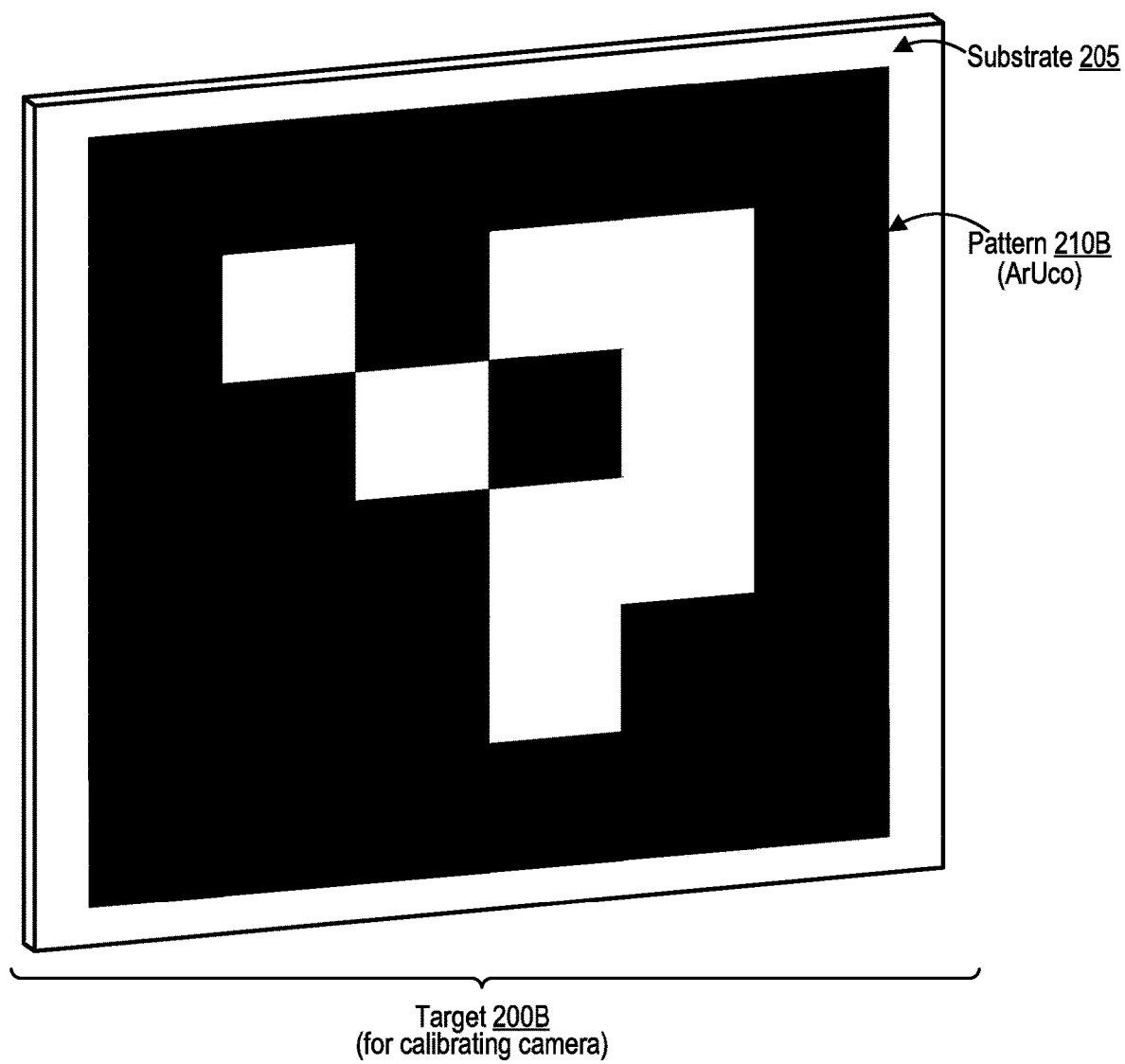
FIG. 2B illustrates a camera calibration target with a ArUco pattern on a planar substrate.

FIG. 2B illustrates a camera calibration target with a ArUco pattern on a planar substrate.

The sensor calibration target 220B illustrated in FIG. 2B, like the sensor calibration target 220A illustrated in FIG. 2A, includes a planar board made from a substrate 205, with a pattern 210B printed, stamped, engraved, imprinted, or otherwise marked thereon. The pattern 210B illustrated in FIG. 2B is an ArUco marker pattern, which includes black border and an inner binary matrix/grid (e.g., each square is dark/black or light/white) which determines its identifier.

By detecting the AuUco pattern, the camera and computing system 110 of the vehicle also identify a grid, similarly to the checkerboard, though potentially with fewer points, as some areas of the ArUco pattern may include contiguous dark/black squares or contiguous light/white squares. By identifying the grid from the representation of the ArUco target captured by the camera (e.g. with lens distortion such as parabolic distortion), and comparing it to a known reference image of the ArUco pattern (e.g., without any distortion), any distortions or other differences may be identified, and appropriate corrections may be generated to counteract these distortions or other differences.

The substrate 205 of FIG. 2B may include or be coated with any previously-discussed substrate material and may be warped or shaped in any manner or include any devices discussed with respect to the substrate 205 of FIG. 2A, and therefore may be detected by, and be useful to calibrate a range sensor of the vehicle, such as a LIDAR, SONAR, SODAR, or radar sensor of the vehicle, and may be detected by a microphone or infrared sensor of the vehicle as well.

Figure 2C:
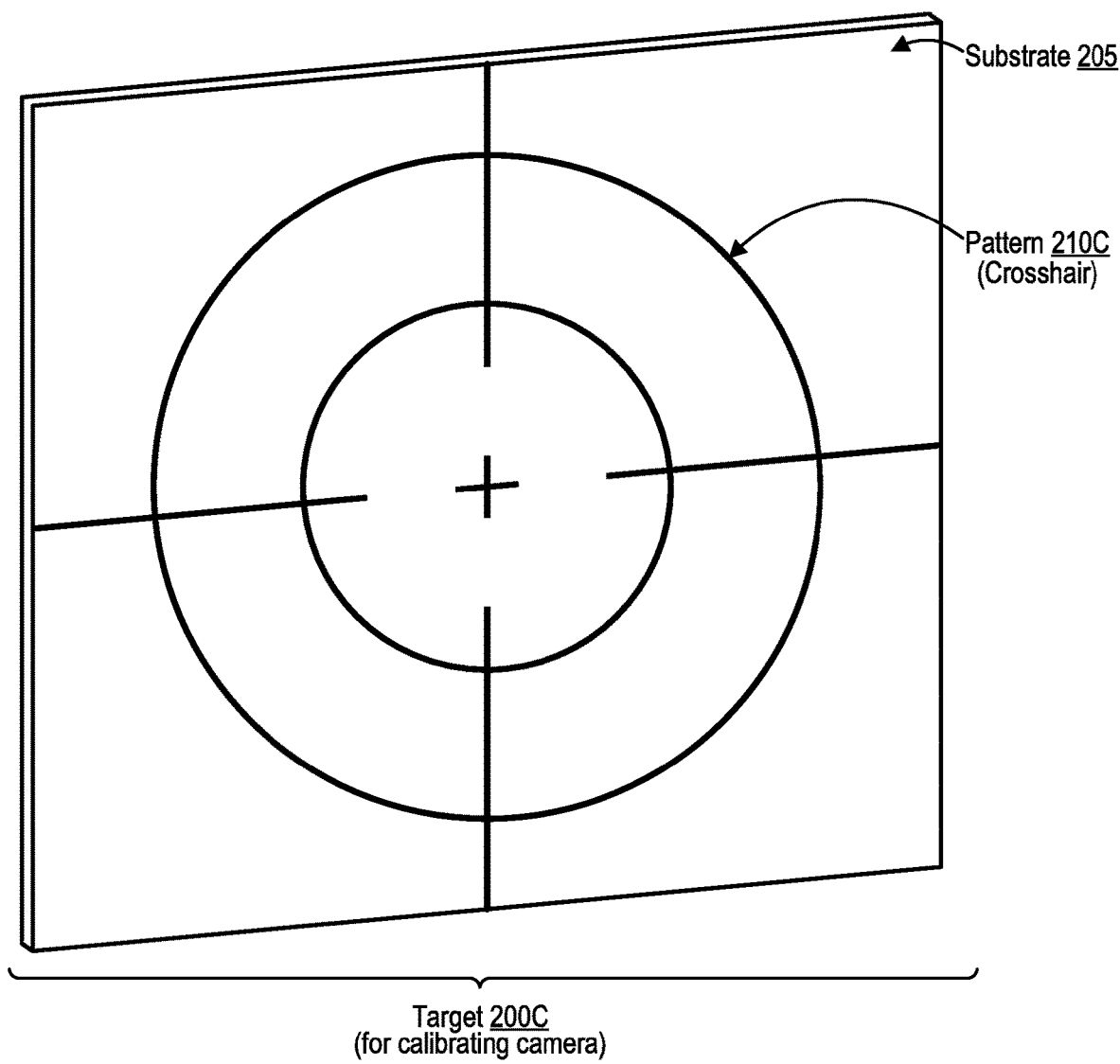
FIG. 2C illustrates a camera calibration target with a crosshair pattern on a planar substrate.

FIG. 2C illustrates a camera calibration target with a crosshair pattern on a planar substrate.

The sensor calibration target 220C illustrated in FIG. 2B, like the sensor calibration target 220A illustrated in FIG. 2A, includes a planar board made from a substrate 205, with a pattern 210C printed, stamped, engraved, imprinted, or otherwise marked thereon. The pattern 210C illustrated in FIG. 2C is an crosshair marker pattern, which includes four dark/black lines and two dark/black circles centered on a light/white background, and with a gap in the dark/black lines near but not at the center, effectively leaving a "+" symbol in the very center.

The camera and computing system 110 can identify the target 200C by identifying the circles, the lines, and the intersections of the same. In doing so, the crosshair pattern is identified from the representation of the target 220C captured by the camera (e.g. with lens distortion), and can be compared it to a known reference image of the crosshair pattern target 200C (e.g., without any distortion). As with the checkerboard and ArUco targets, any distortions or other differences may be identified, and appropriate corrections may be generated to counteract these distortions or other differences.

The substrate 205 of FIG. 2C may include or be coated with any previously-discussed substrate material and may be warped or shaped in any manner or include any devices discussed with respect to the substrate 205 of FIG. 2A, and therefore may be detected by, and be useful to calibrate a range sensor of the vehicle, such as a LIDAR, SONAR, SODAR, or radar sensor of the vehicle, and may be detected by a microphone or infrared sensor of the vehicle as well.

While the only patterns 210A-C discussed with respect to camera sensor targets are checkerboard patterns 210A, ArUco patterns 210B, and crosshair patterns 210C, other patterns that are not depicted can additionally or alternatively be used. For example, bar codes, quick response (QR) codes, Aztec codes, Semacodes, Data Matrix codes, PDF417 codes, MaxiCodes, Shotcodes, High Capacity Color Barcodes (HCCB), or combinations thereof may be used as patterns 210 that can be recognized using the camera and computing device 110.

Figure 2D:
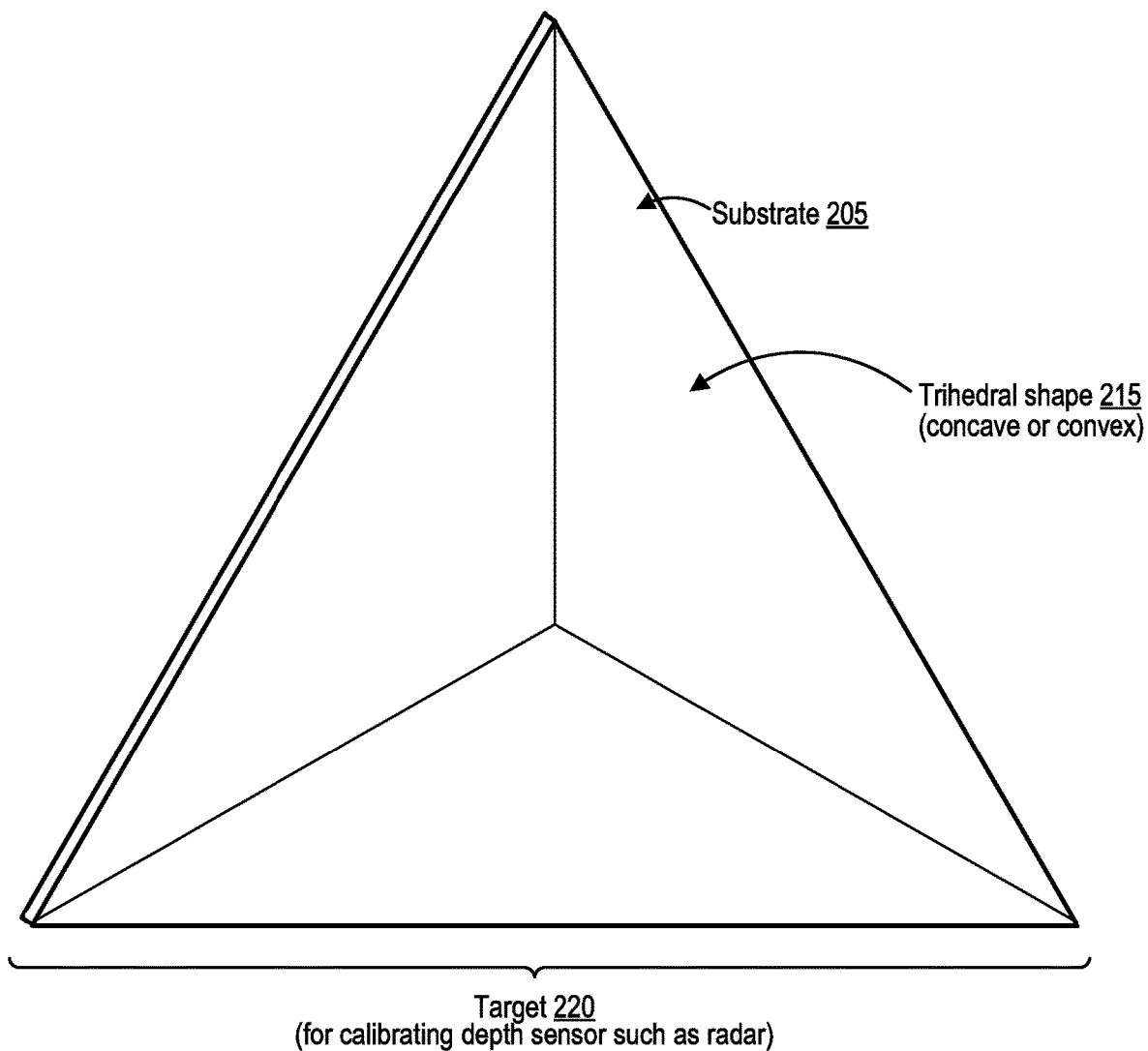
FIG. 2D illustrates a range sensor calibration target with a trihedral shape.

FIG. 2D illustrates a range sensor calibration target with a trihedral shape.

The sensor calibration target 220 of FIG. 2D is made to be detected by, and use for calibration of, a range sensor, such as a radar sensor (or LIDAR, SONAR, or SODAR) of the vehicle. In particular, the sensor calibration target 220 of FIG. 2D is trihedral in shape, and may be a concave or convex trihedral corner, essentially a triangular corner of a cube. Alternately, it may be a different shape, such as a corner of a different polyhedron (at least portions of all faces of the polyhedron that touch a particular vertex). Such a shape, especially when concave and where perpendicular faces are included, produces a particularly strong radar echo and thus a particularly strong radar cross section (RCS) because incoming radio waves are backscattered by multiple reflection. The RCS of the trihedral corner target is given by: $\sigma = (4 \cdot \pi \cdot a^4)/(3 \cdot \lambda^2)$, where a is the length of the side edges of the three triangles, and $\lambda$ is a wavelength of radar transmitter.

The substrate 205 of the sensor calibration target 220 of FIG. 2D may include or be coated with any previously-discussed substrate material and may be warped or shaped in any manner, or include any devices, discussed with respect to the substrate 205 of FIG. 2A. In one embodiment, the substrate 205 of the sensor calibration target 220 of FIG. 2D may be metal, may be electrically conductive, may be reflective or retroreflective, or some combination thereof.

Figure 2E:
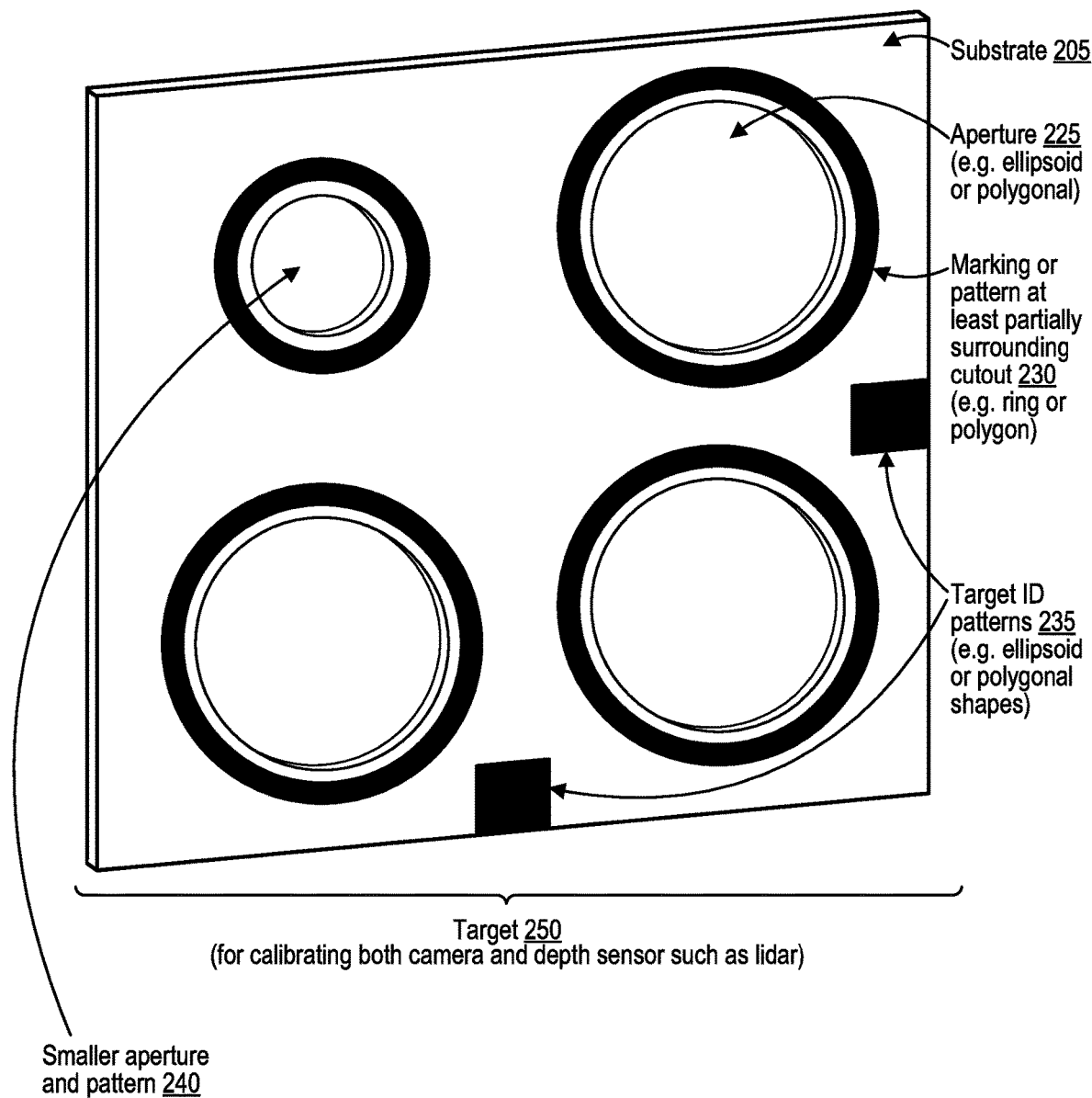
FIG. 2E illustrates a combined range sensor and camera calibration target with apertures from a planar substrate that are surrounded by visually recognizable markings.

FIG. 2E illustrates a combined range sensor and camera calibration target with apertures from a planar substrate that are surrounded by visually recognizable markings.

The combined range sensor and camera calibration target 250 of FIG. 2E includes multiple apertures 225 in a substrate 205, and includes visual markings or patterns 230 at least partially surrounding each aperture. In particular, the target 250 includes four symmetrical circular or ellipsoid apertures 225 from a light/white substrate 205 with symmetrical dark/black circular or ellipsoid rings 230 around the apertures, with three of the apertures/ring combinations being a first size (e.g., apertures being 30 cm in diameter and the corresponding rings slightly larger) and a fourth aperture/ring combination 240 being a second size (e.g., the aperture being 26 cm in diameter and the corresponding ring slightly larger). The rings around the three larger apertures 225 are likewise larger than the ring around the smaller aperture 240. In some cases, one may be larger than the other three, or two may be larger or smaller than the other two, or some combination thereof. The apertures 225/240 may alternately be referred to as cutouts, holes, voids, orifices, vents, openings, gaps, perforations, interstices, discontinuities or some combination thereof. In some cases, different types of surface discontinuities may be used instead of or in addition to the apertures 225/240, such as raised surfaces or bumps that can also be detected by depth/range sensors such as radar or lidar.

The combined range sensor and camera calibration target 250 of FIG. 2E also includes additional markings or patterns at certain edges of the substrate, identified as target identification (ID) markers 235. The particular combined range sensor and camera calibration target 250 of FIG. 2E includes target identification (ID) markers 235 on the two sides of the substrate opposite the smaller aperture/ring combination 240, but other combined range sensor and camera calibration targets 250 may have one, two, three, or four target identification (ID) markers 235 along any of the four sides of the square substrate, or may have target identification (ID) markers 235 in an amount up to the number of sides of the polygonal substrate 205 where the substrate 205 is shaped like a non-quadrilateral polygon. That is, if the substrate 205 is an octagon, each combined combined range sensor and camera calibration target 250 may have anywhere from zero to eight target identification (ID) markers 235. Different patterns of target identification (ID) markers 235 are further visible in FIG. 5.

The substrate 205 of FIG. 2E may include or be coated with any previously-discussed substrate material and may be warped or shaped in any manner or include any devices discussed with respect to the substrate 205 of FIG. 2A, and therefore may be detected by, and be useful to calibrate a range sensor of the vehicle, such as a LIDAR, SONAR, SODAR, or radar sensor of the vehicle, and may be detected by a microphone or infrared sensor of the vehicle as well.

In some cases, the combined range sensor and camera calibration target 250 may have more or fewer apertures and corresponding visual markings than the four apertures and corresponding visual markings illustrated in FIG. 2E.

Additional targets not depicted in FIG. 2A-2E may also be possible for calibration of different types of vehicle sensors. For example, targets for intrinsic or extrinsic calibration of infrared cameras or other types of infrared sensors of a vehicle 102 may include patterns formed using heating elements, optionally in front of, behind, or beside visual markings or substrate apertures or speakers for extrinsic calibration with cameras or range sensors or microphones, respectively. Targets for intrinsic or extrinsic calibration of microphones or other types of audio sensors of a vehicle 102 may include speakers or patterns formed using speakers, optionally in front of, behind, or beside visual markings or substrate apertures or heating elements for extrinsic calibration with cameras or range sensors or infrared sensors, respectively.

Figure 3:
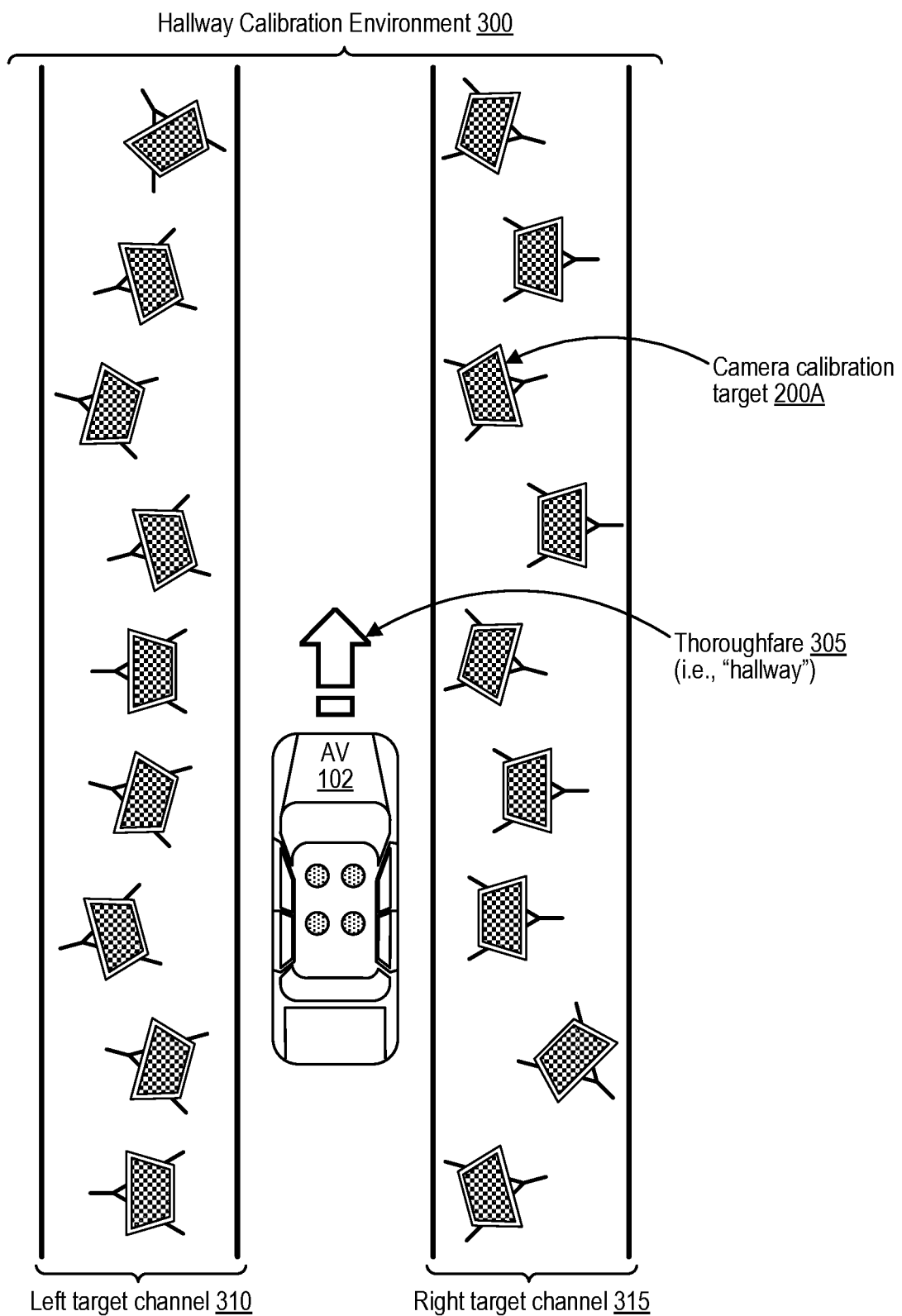
FIG. 3 illustrates a top-down view of a hallway calibration environment in which a vehicle traverses a drive path along which the vehicle is flanked by vehicle sensor calibration targets.

FIG. 3 illustrates a top-down view of a hallway calibration environment in which a vehicle traverses a drive path along which the vehicle is flanked by vehicle sensor calibration targets.

The hallway calibration environment 300, which may also be referred to as a tunnel calibration environment, includes a thoroughfare 305 through which a vehicle 102 drives, the thoroughfare 305 flanked on either side by targets detectable by the sensors 180 of the vehicle 102. The thoroughfare 305 may also be referred to as the drive path, the drive channel, the hallway, or the tunnel. Some of the targets are arranged in a left target channel 310 that is to the left of the vehicle 102 as the vehicle 102 traverses the thoroughfare 305. Others of the targets are arranged in a right target channel 315 that is to the right of the vehicle 102 as the vehicle 102 traverses the thoroughfare 305. In FIG. 3, the targets in the left target channel 310 and right target channel 315 are all checkerboard camera targets 200A as illustrated in FIG. 2A, but they may include any other type of target discussed herein that is used to calibrate any vehicle sensor or combination of vehicle sensors. The left target channel 310 and right target channel 315 may include a combination of different target types, similarly to the calibration environment of FIG. 6; the targets need not all be of a uniform type as illustrated in FIG. 3.

The vehicle 102 drives along the thoroughfare 305, stopping after incremental amounts, for example, every foot, every N feet, every meter, or every N meters, where N is a number greater than zero, such as 1, 2, 3, 4, 5, 6, 7, 8, 9, or 10. At each stop, the vehicle 102 captures data using each of its vehicle sensors, or at least each of the vehicle sensors that it intends to calibrate. The vehicle 102 stopping helps prevent issues caused by sensors running while the vehicle 102 is in motion, such as motion blur or rolling shutter issues in cameras. The vehicle 102 stopping also ensures that sensors can capture data while the vehicle 102 is in the same position, which may be important for extrinsic calibration of two or more sensors with respect to each other so that a location within data gathered by a first vehicle sensor (e.g., a range sensor such as a LIDAR or radar sensor) can be understood to correspond to a location within data gathered by a second vehicle sensor (e.g., a camera). The vehicle 102 may in some cases traverse the thoroughfare 305 multiple times, for example N times in each direction, where N is, for example, 1, 2, 3, 4, 5, 6, 7, 8, 9, 10, 11, 12, 13, 14, 15, 16, 17, 18, 19, or 20.

The sensor targets illustrated in FIG. 3 are illustrated as each mounted on separate easel-style stands. Other types of stands are also possible, such as the type illustrated in FIG. 4 and FIG. 5. Furthermore, multiple sensor targets, of the same type or of different types may be supported by each stand (as in FIG. 4 and FIG. 5) even though this is not illustrated in FIG. 3.

The sensor targets illustrated in FIG. 3 are illustrated such that some are positioned closer to the thoroughfare 305 while some are positioned farther from the thoroughfare 305. Additionally, while some targets in FIG. 3 are facing a direction perpendicular to the thoroughfare 305, others are angled up or down with respect to the direction perpendicular to the thoroughfare 305. While the sensor targets illustrated in FIG. 3 all appear to be at the same height and all appear to not be rotated about an axis extending out from the surface of the target, it should be understood that the sensor targets may be positioned at different heights and may be rotated about an axis extending out from the surface of the target as in the targets of FIG. 4 and FIG. 5. Together, the distance from the thoroughfare 305, the direction faced relative to the thoroughfare 305, the clustering of targets, the height, and the rotation about an axis extending out from the surface of the target may all be varied and modified to provide better intrinsic and extrinsic calibration. That is, these variations assist in intrinsic calibration in that collection of data with representations of targets in various positions, rotations, and so forth ensures that targets are recognized as they should be by any sensor, even in unusual positions and rotations, and that any necessary corrections be performed to data captured by sensors after calibration. These variations assist in extrinsic calibration in that the different positions and rotations and so forth provide more interesting targets for range sensors, such as lidar, radar, sonar, or sodar, and allow range sensors to aid in interpretation of optical data collected by a camera of the vehicle 102.

While the thoroughfare 305 of the hallway calibration environment 300 of FIG. 3 is a straight path, in some cases it may be a curved path, and by extension the left target channel 310 and right target channel 315 may be curved to follow the path of the thoroughfare 305.

While the hallway calibration environment 300 is effective in providing an environment with which to calibrate the sensors 180 of the vehicle 102, it is inefficient in some ways. The hallway calibration environment 300 is not space efficient, as it occupies a lot of space. Such a hallway calibration environment 300 is best set up indoors so that lighting can be better controlled, so the hallway calibration environment 300 requires a large indoor space, and by extension, a lot of light sources, which is not energy-efficient or cost-efficient. Because of how much space the hallway calibration environment 300 takes up, it is more likely to have to be taken down and set back up again, affecting consistency of calibration between different vehicles whose sensors are calibrated at different times. Further, because the setup of the hallway calibration environment 300 requires the vehicle 102 to drive through it, different vehicles 102 might be aligned slightly differently in the thoroughfare 102, and might drive a slightly different path through the thoroughfare 102, and might stop at slightly different spots and/or frequencies along the drive, due to manufacturing differences in the vehicle 102 and due to human error in setting the vehicle 102 up, all of which affects consistency of the calibration. Trying to correct for all of these potential inconsistencies, and turning the vehicle around to move it through the hallway calibration environment 300 multiple times, is time and labor intensive, making the hallway calibration environment 300 time-inefficient. Additionally, because the targets are primarily to the left and right sides of the vehicle 102 hallway calibration environment 300, vehicle sensors might not be as well calibrated in the regions to the front and rear of the vehicle. Using a thoroughfare 305 with some turns can help alleviate this, but again causes the hallway calibration environment 300 to take up more space, increasing space-inefficiency.

Figure 4:
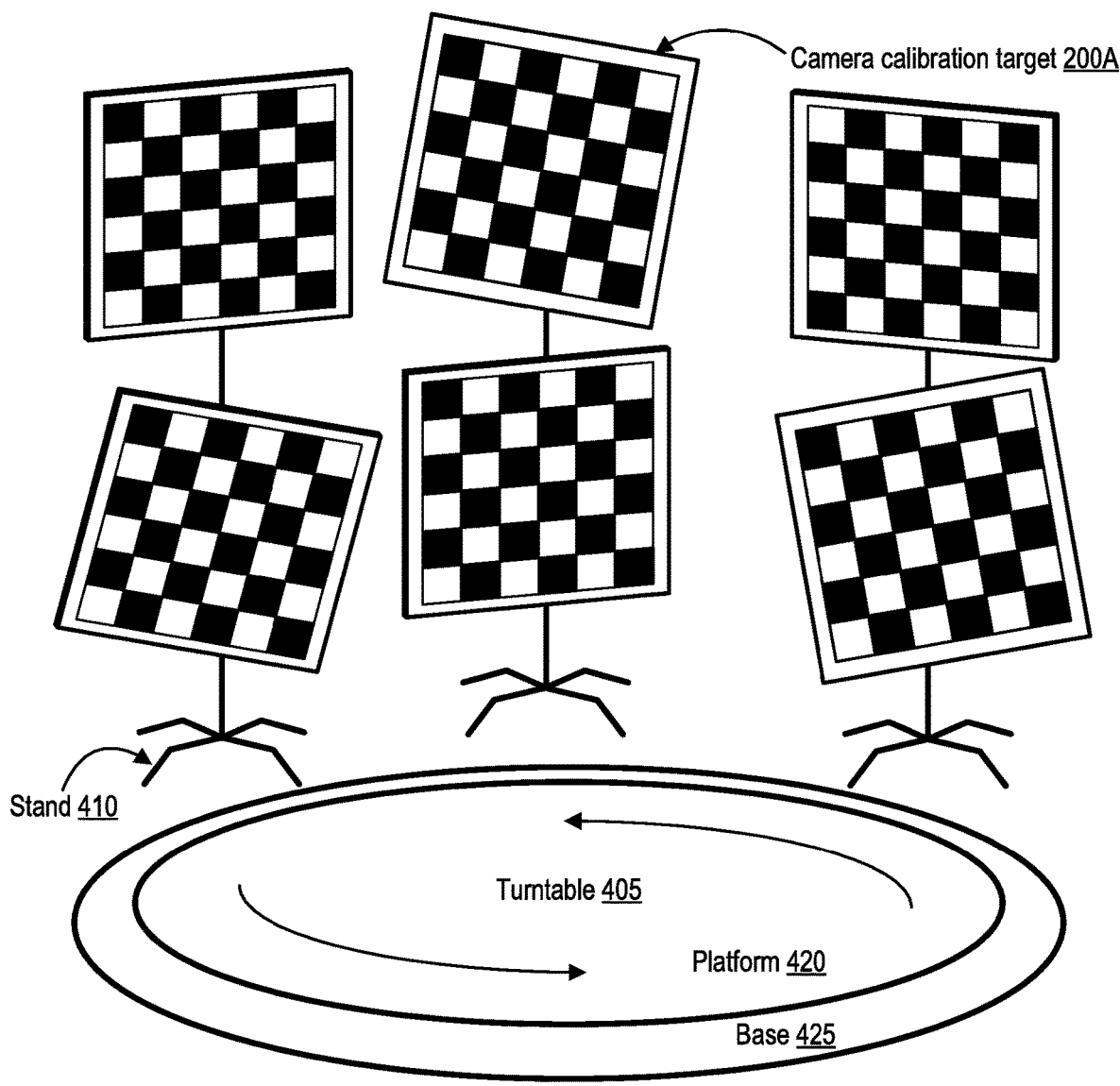
FIG. 4 illustrates a perspective view of a dynamic scene calibration environment in which a turntable that is at least partially surrounded by vehicle camera calibration targets rotates a vehicle so that the vehicle can perform intrinsic calibration of its camera sensors.

FIG. 4 illustrates a perspective view of a dynamic scene calibration environment in which a turntable that is at least partially surrounded by vehicle camera calibration targets rotates a vehicle so that the vehicle can perform intrinsic calibration of its camera sensors.

The dynamic scene calibration environment 400 of FIG. 4 includes a motorized turntable 405 with a platform 420 that rotates about a base 425. In some cases, the platform 420 may be raised above the floor/ground around the turntable 405, with the base 425 gradually inclined up to enable the vehicle 102 to drive up the base 425 and onto the platform 420, or to drive off of the platform 420 via the base 425. A vehicle 102 drives onto the platform 420 of the turntable 405, and the motors actuate to rotate platform 420 of the turntable 405 about the base 425, and to thereby rotate the vehicle 102 relative to the base 425 (and therefore relative to the floor upon which the base 425 rests). While the arrows on the turntable 405 show a counter-clockwise rotation of the platform 420, it should be understood that the platform 420 of the motorized turntable 405 can be actuated to rotate clockwise as well. The turntable 405 is at least partially surrounded by targets mounted on stands 410. In FIG. 4, the illustrated targets are all checkerboard-patterned camera calibration targets 200A as depicted in FIG. 2A, allowing for calibration of cameras of the vehicle 102. In other embodiments, such as in FIG. 5, the targets around the motorized turntable may include any other type of target discussed herein that is used to calibrate any vehicle sensor or combination of vehicle sensors.

In one embodiment, the platform 420 of the motorized turntable 405 may be rotated by predetermined intervals (measured in degrees/radians or an amount at a time), for example intervals of ten degrees, in between point the turntable stops so that the vehicle 102 can capture data with its sensors 180. The platform 420 of the motorized turntable 405 can start and stop in this manner, and can eventually perform a full 360 degree rotation in this manner. The motorized turntable 405 may in some cases perform multiple full 360 degree rotations in one or both rotation directions (clockwise and counterclockwise), for example N rotations in each rotation direction, where N is, for example, 1, 2, 3, 4, 5, 6, 7, 8, 9, 10, 11, 12, 13, 14, 15, 16, 17, 18, 19, or 20.

Figure 5:
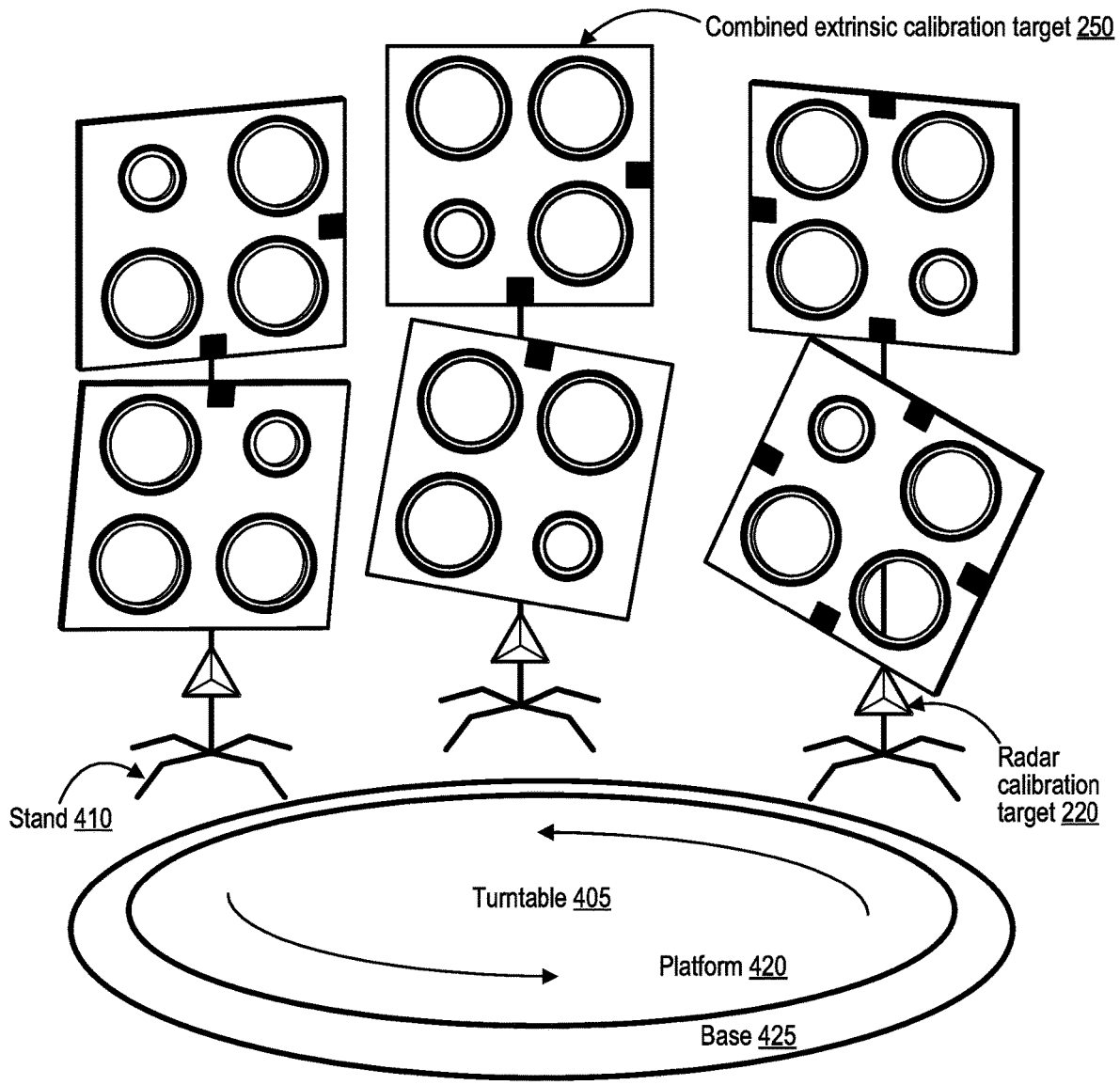
FIG. 5 illustrates a perspective view of a dynamic scene calibration environment in which a turntable that is at least partially surrounded by combined vehicle range sensor and vehicle camera calibration targets rotates a vehicle so that the vehicle can perform extrinsic calibration of its range sensors and camera sensors.

FIG. 5 illustrates a perspective view of a dynamic scene calibration environment in which a turntable that is at least partially surrounded by combined vehicle range sensor and vehicle camera calibration targets rotates a vehicle so that the vehicle can perform extrinsic calibration of its range sensors and camera sensors.

The dynamic scene calibration environment 500 of FIG. 5 includes the same motorized turntable 405 as in FIG. 4. A vehicle 102 drives onto the platform 420 of the turntable 405, and the motors actuate to rotate the platform 420 of the turntable 405, and thereby rotate the platform 420 (and the vehicle 102) about the base 425, clockwise, counter-clockwise, or one then the other. The turntable 405 is at least partially surrounded by targets mounted on stands 410. In FIG. 5, the illustrated targets include both a set of combined range/camera extrinsic calibration targets 250 as depicted in FIG. 2E and a set of trihedral radar calibration targets 220 as depicted in FIG. 2D. Each stand 410 mounts two combined range/camera extrinsic calibration targets 250 and one trihedral radar calibration targets 220, which in some cases may be a known distance from the combined range/camera extrinsic calibration targets 250 on the stand 410, permitting extrinsic calibration between the radar and the range sensor (lidar, radar, sonar, sodar) and/or camera calibrated using the combined range/camera extrinsic calibration targets 250.

As the vehicle 102 rotates about the base 425 on the platform 420 of the motorized turntable 405, and/or during stops between rotations, the vehicle 102 and its computer 110 can detect the combined range/camera extrinsic calibration targets 250 using both its range sensors (e.g., lidar, etc.) and cameras by detecting the apertures 225 with the range sensors and the markings 230 around the apertures and the target identifier markings 235 with the cameras. In doing so, the vehicle 102 and its computer 110 can detect a center of the circular aperture 225 easily, since range sensors such as lidar typically provide a point cloud of depth measurements that can help identify where the widest parts of each circle are. The rings 230 detected by the camera will also have the same centers as the apertures, so the range sensor and camera know they are looking at the exact same locations for each of these center points. Thus, the camera and range sensor may be extrinsically calibrated so that their positional awareness of the surroundings of the vehicle 102 can be positionally aligned. The extrinsic calibration may, in some cases, output one or more matrices (e.g., one or more transformation matrices) used for transforming a camera location to a range sensor location or vice versa, via translation, rotation, or other transformations in 3D space. Calibration affects interpretation of data captured by the sensors after calibration is complete. The transformation(s) that are generated during this extrinsic calibration can include one or more types of transformations, including translations, stretching, squeezing, rotations, shearing, reflections, perspective distortion, distortion, orthogonal projection, perspective projection, curvature mapping, surface mapping, inversions, linear transformations, affine transformations. The translational and rotational transformations may include modifications to position, angle, roll, pitch, yaw, or combinations thereof. In some cases, specific distortions may be performed or undone, for example by removing distortion (e.g., parabolic distortion) caused by use of a specific type of lens in a camera or other sensor, such as a wide-angle lens or a fisheye lens or a macro lens.

The transformation(s) generated by the computer 110 of the vehicle 102 may be used for extrinsic calibration of a first sensor (e.g., the camera) with respect to a second sensor (e.g., LIDAR or RADAR or SONAR or SODAR or another range sensor), so that the computer 102 can map positions identified in the data output from each sensor to the real world environment around the vehicle 102 (e.g., in the field of view of the sensors 180 of the vehicle 102) and relative to each other, based on known relative positions of features identified within the outputs of each sensor. Such features may include the visual markings of the combined target 250 as identified by the camera, the apertures as identified by the range sensor, and optionally a trihedral target 220 affixed near or on the target 250 as in the environment 500 of FIG. 5. For example, if translation of positions in data captured by the first sensor to positions in the real world around the vehicle are already clear through intrinsic calibration, but translation of positions in data captured by the second sensor to positions in the real world around the vehicle are already clear through intrinsic calibration (or vice versa), then the transformation generated through this extrinsic calibration can translate positions in data captured by the second sensor to positions in the real world around the vehicle based on (1) the position in the real world around the vehicle of the data from the first sensor, and (2) the relative positioning of the position in the data from the first sensor and the position in the data from the second sensor. Thus, a sensor that has not been intrinsically calibrated can still be calibrated extrinsically relative to another sensor, and can still benefit from the increase in accuracy granted by the intrinsic calibration of that other sensor.

The trihedral targets 220 can also have a known distance from the combined range/camera extrinsic calibration targets 250, and in some cases specifically from the centers of the apertures 225 and rings 230 of the targets 250, allowing extrinsic calibration between the range sensor (e.g., radar) that recognizes the trihedral targets 220 and the range sensor (e.g., lidar) that recognizes the apertures 225 and the camera that recognizes the rings/markings 230.

In other embodiments, the targets around the motorized turntable 405 may include any other type of target discussed herein that is used to calibrate any vehicle sensor or combination of vehicle sensors, such as the target 200A of FIG. 2A, the target 200B of FIG. 2B, the target 200C of FIG. 2C, the target 220 of FIG. 2D, the target 250 of FIG. 2E, targets with heating elements detectable by infrared sensors of the vehicle 102, targets with speakers detectable by microphones of the vehicle 102, targets with reflective acoustic properties detectable by SONAR/SODAR/ultrasonic/infrasonic sensors of the vehicle 102, or some combination thereof.

The stands 410 used in FIG. 3-6 may include any material discussed with respect to the substrate 205, such as paper, cardboard, plastic, metal, foam, or some combination thereof. In some cases, certain stands may be made of a plastic such polyvinyl chloride (PVC) to avoid detection by certain types of range sensors, such as radar, which detect metal better than plastic.

In one embodiment, the platform 420 of the motorized turntable 405 may be rotated about the base 425 by predetermined intervals (measured in degrees/radians or an amount at a time), for example intervals of ten degrees, in between point the turntable stops so that the vehicle 102 can capture data with its sensors 180. The intervals may be N degrees, where N is, for example, 1, 2, 3, 4, 5, 6, 7, 8, 9, 10, 11, 12, 13, 14, 15, 16, 17, 18, 19, or 20. The platform 420 of the motorized turntable 405 can start and stop its rotation via activation and deactivation of its motor(s) 730 in this manner, and can eventually perform a full 360 degree rotation in this manner. The platform 420 of the motorized turntable 405 may in some cases perform multiple full 360 degree rotations about the base 425 in one or both rotation directions (clockwise and counterclockwise), for example N rotations in each rotation direction, where N is, for example, 1, 2, 3, 4, 5, 6, 7, 8, 9, 10, 11, 12, 13, 14, 15, 16, 17, 18, 19, or 20.

Figure 6:
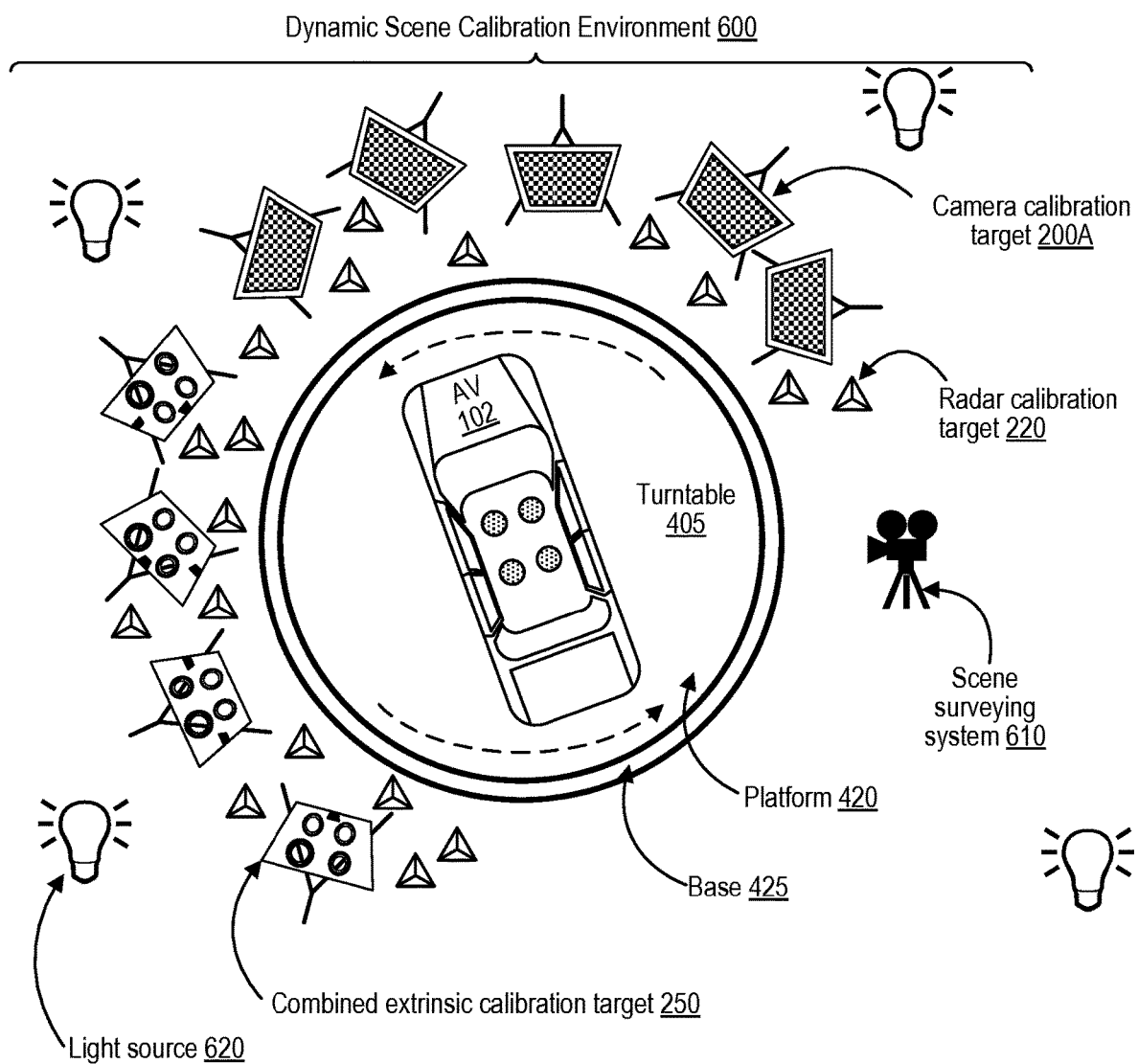
FIG. 6 illustrates a top-down view of a dynamic scene calibration environment in which a turntable that is at least partially surrounded by both vehicle camera calibration targets and combined vehicle range sensor and vehicle camera calibration targets rotates a vehicle so that the vehicle can perform both intrinsic calibration of its camera sensors and extrinsic calibration of its range sensors and camera sensors.

FIG. 6 illustrates a top-down view of a dynamic scene calibration environment in which a turntable that is at least partially surrounded by both vehicle camera calibration targets and combined vehicle range sensor and vehicle camera calibration targets rotates a vehicle so that the vehicle can perform both intrinsic calibration of its camera sensors and extrinsic calibration of its range sensors and camera sensors.

The dynamic scene calibration environment 600 of FIG. 6 is, in some ways, of a combination of the dynamic scene calibration environment 400 of FIG. 4 and the dynamic scene calibration environment 500 of FIG. 5 in that three types of targets are positioned around the motorized turntable 405. These three types of targets include the checkerboard-patterned camera calibration targets 200A used in the dynamic scene calibration environment 400 of FIG. 4 and the trihedral radar calibration targets 220 and combined extrinsic calibration targets 250 used in the dynamic scene calibration environment 500 of FIG. 5. In FIG. 6, all three types of targets stand separately from each other.

Any of the stands used in FIG. 3-6 may be any type of stands, such as easel-type stands, tripod-type stands, or the rod stands 410 with wide bases seen in FIG. 4 and FIG. 5. Any of the stands used in FIG. 3-6 may include paper, cardboard, plastic, metal, foam, or some combination thereof as previously discussed. The stands in some cases may include motors and actuators enabling positions and/or angles of rotation of targets to be manipulated, for example to be more clearly visible given lighting conditions supplied by light sources 620, or to access aa region of a point of view of a particular vehicle sensor from which that vehicle sensor has not captured enough data and therefore around which the vehicle sensor is under-calibrated. In some cases, these motors and their actuators may be controlled wirelessly by the vehicle 102 and/or scene surveying system 610 as discussed further with respect to FIG. 7 and FIG. 17A-B.

The dynamic scene calibration environment 600 of FIG. 6 also includes a scene surveying system 610, which may include one or more cameras, one or more range sensors (e.g., radar, lidar, sonar, sodar, laser rangefinder). This may take the form of a robotic total station (RTS). While the vehicle 102, its sensors 180, and the targets are enough to perform intrinsic calibration of sensors to correct for distortions, for example, and to perform extrinsic calibration of sensors to align locations within data captured by different sensors, for example, in some cases more information may be needed to understand how far these locations within data captured by different sensors are from the vehicle itself. The scene surveying system 610 captures visual and/or range data of at least a subset of the dynamic scene calibration environment 600, including the motorized turntable 410, at least some of the targets, and the vehicle 102 itself. Key points on the vehicle 102 may be tracked to identify the current pose (rotation orientation/position) of the vehicle 102 (and therefore of the platform 420 about the base 425). Data captured by the scene surveying system 610 can also be sent to the vehicle 102 and used to verify the data captured by the sensors and the intrinsic and extrinsic calibrations performed based on this data. The dynamic scene calibration environment 600 also includes several light sources 620 set up around the turntable 405. These light sources 620 may include any type of light source, such as incandescent bulbs, halogen bulbs, light emitting diodes (LEDs), and so forth. In some cases, the light sources 620 may include stage lights or spotlights. Mirrors and/or lenses may be used to manipulate light from the light sources 620 to relatively evenly illuminate the targets and/or the dynamic scene calibration environment 600 as a whole. Additional light sources may be positioned over the turntable 405 or behind some or all targets, especially if targets use a transparent or translucent substrate. The light sources 620 are used to improve readings from cameras of the vehicle and of the scene surveying system 610, and can in some cases be controlled wirelessly by the vehicle 102 and/or scene surveying system 610 as discussed further with respect to FIG. 7 and FIG. 17A-B.

By including targets for intrinsic sensor calibration as well as targets for extrinsic calibration around the turntable 405, the sensors 180 of the vehicle 102 can receive a comprehensive calibration in the dynamic scene calibration environment 600. The dynamic scene calibration environments 400, 500, and 600 of FIGS. 4-6 have several advantages over the static hallway calibration environment 300 of FIG. 3. First, the dynamic scene calibration environment is more space-efficient, as it only requires space for the vehicle turntable 405, space for some targets, light sources 620, and scene surveying system 610. There is no need to clear space for a thoroughfare 305 or other long path. Because fewer light sources 620 are needed to light a smaller space like the dynamic scene calibration environment 600 than a larger space like the hallway calibration environment 300, the dynamic scene calibration environment 600 is more energy-efficient in terms of lighting. Because the vehicle engine can be turned off after the vehicle is on the turntable 405, the dynamic scene calibration environment 600 is more energy-efficient in terms of vehicular power usage. Because changing rotation directions is considerably quicker than performing a U-turn in a vehicle to change driving directions, and because a smaller space is more likely to remain untouched and therefore won't need take-down and setup after and before each use, the dynamic scene calibration environment 600 is more time-efficient. Because the target and lighting setup, and the movement of the vehicle 102, can be better controlled, the calibration results are more consistent across vehicles 102, which further allows calibration configurations of different vehicles 102 to be more readily compared and outliers identified as potentially symptomatic of a sensor defect or a miscalibration issue. Presence of guide railings (not shown) along the platform of the turntable may further increase consistency of calibration by increasing consistency of positioning of the vehicle 102 along the platform of the turntable 405. The dynamic scene calibration environment 600 also allows the sensors 180 of the vehicle 102 to capture data all around the vehicle 102—including in the front and rear of the vehicle 102, which receive less data in the hallway calibration environment 300.

FIG. 7 illustrates a system architecture of an dynamic scene calibration environment.

The system architecture 700 of the dynamic scene calibration environment of FIG. 7 includes a number of main elements, each with sub-components. The main elements include the autonomous vehicle 102, a dynamic scene control bridge 710, the motorized turntable system 450, a lighting system 760, a target control system 770, a scene surveying system 610, a robotic scene control system 790, and a power supply system 702.

The autonomous vehicle 102 includes the one or more sensors 180, the one or more internal computing devices 110, one or more wireless transceivers 705 (integrated with communication service 116), and any other elements illustrated in and discussed with respect to FIG. 1. The sensors 180 may in some cases include one or more GPRS receivers, Bluetooth® beacon-based positioning receivers, an inertial measurement unit (IMU), one or more cameras, one or more lidar sensors, one or more radar sensors, one or more sonar sensors, one or more sodar sensors, and/or one or more other sensors discussed herein, which may in some cases be used to identify when the vehicle 102 is not on the platform 420, when the vehicle 102 is on the platform 420, when the vehicle 102 in a defined position on the platform (e.g., optionally as guided by guide railings on the platform), when the vehicle 102 have begun rotating from a stopped position, and/or when the platform 420 and/or the vehicle 102 have stopped rotating. The computing device 110 of the vehicle 102 (or its sensors 180) may then automatically communicate one or more signals or messages through wired and/or wireless communication interfaces, for instance through the wireless transceiver 705, to the bridge 710, the computing device 110 of the vehicle 102 (if the communication is straight from the sensors 180), and/or the computing device 745 of the motorized turntable system 405 to convey any of these observations/detections/identifications by the sensors 180, which may be used to trigger various actions, such as rotation or stop of rotation of the turntable 405, collection of sensor data or stop of collection of sensor data at the vehicle 102, or some combination thereof.

The dynamic scene control bridge 710 includes one or more computing devices 715 and one or more wired and/or wireless transceivers 720. The dynamic scene control bridge 710 is optional, but can serve as a "middleman" or "router" between the autonomous vehicle 102 and the remaining main elements of the system architecture 700, such as the dynamic scene control bridge 710, the motorized turntable system 450, the lighting system 760, the target control system 770, the scene surveying system 610, and the power supply system 702. The dynamic scene control bridge 710 can in some cases convert file formats, perform mathematical operations such as operation conversions, or otherwise interpret instructions or data as necessary so that the vehicle 102 can successfully communicate with other elements. In fact, the dynamic scene control bridge 710 can perform similar conversions, mathematical operations, or interpretations in its role as a middleman between any two or more devices of the architecture 700.

The motorized turntable system 405 includes a turntable structure 725 as well as one or more motors, encoders, actuators, and/or gearboxes 730 for actuating rotation of the turntable structure 725 while the vehicle 102 is on it. The motorized turntable 725 may include a platform 420, which is a surface upon which the vehicle 102 rests during calibration. The platform 420 is rotatable about a base 425 of the motorized turntable structure 725, with one or more motors 730 that, when actuated or activated, rotate the platform 420 about the base 425, and which stop the rotation of the platform 420 about the base 425 when the motors 730 are deactivated. For example, the one or more motors 730 may rotate the platform 420 about the base 425 from a first rotational orientation to a second rotational orientation, or alternately back to the first rotational orientation (e.g., if the rotation is a 360 degree rotation or a multiple thereof). A rotational orientation of the platform 420 relative to the base 425, or of the vehicle 102 relative to the base 425, may alternately be referred to as a rotational position. The motorized turntable system 405 may include one or more sensors 735, such as pressure sensors, for example to identify whether or not the vehicle 102 is on the turntable structure 725, whether or not the vehicle 102 is positioned correctly on the turntable structure 725, or how the vehicle's weight is distributed generally or across the platform 420's top surface (which is in contact with the wheels and/or tires vehicle 102) of the turntable structure 725. The sensors 735 may in some cases identify when the platform 420 has no vehicle 102 on it, when the vehicle 102 is on the platform 420, when the vehicle 102 in a defined position on the platform (e.g., optionally as guided by guide railings on the platform), when the platform 420 and/or the vehicle 102 have begun rotating from a stopped position, and/or when the platform 420 and/or the vehicle 102 have stopped rotating. The motorized turntable system 405 may then automatically communicate one or more signals or messages through wired and/or wireless communication interfaces to the bridge 710, vehicle 102, and/or the computing device 745 of the motorized turntable system 405 to convey any of these observations/detections/identifications by the sensors 735, which may be used to trigger various actions, such as rotation or stop of rotation of the turntable 405, collection of sensor data or stop of collection of sensor data at the vehicle 102, or some combination thereof. The controller 740 may be used to control the actuation of the motors, encoders, actuators, and/or gearbox(es) 730, for example to control a speed or rate or angular velocity of rotation, an angular acceleration (or deceleration) of rotation, a direction of rotation (e.g., clockwise or counterclockwise), or some combination thereof. The motorized turntable system 405 includes one or more computing devices 745 and one or more wired and/or wireless transceivers 750, through which it may interact with the vehicle 102, the dynamic scene control bridge 710, or any other element in the architecture 700.

The lighting system 760 includes one or more light sources 620 and one or more motors and/or actuators 762 for activating or turning on each of the light sources 620, disabling or turning off each of the light sources 620, fading or dimming each of the light sources 620, brightening each of the light sources, or moving each of the light sources 620 with an actuated motor (e.g., to shine on a particular target). The lighting system 760 includes one or more computing devices 764 and one or more wired and/or wireless transceivers 766, through which it may interact with the vehicle 102, the dynamic scene control bridge 710, or any other element in the architecture 700.

The target control system 770 includes one or more targets and target support structure 772. The targets may include one or more of any of the targets 200A, 200B, 200C, 220, and/or 250 illustrated in FIG. 2A-2E, any other target described herein, any other sensor calibration target, or some combination thereof. The target support structures may include easel-type support structures, tripod-type support structures, or the rod-type support structures 410 with wide bases seen in FIG. 4 and FIG. 5. The target support structures may include any material discussed with respect to the substrate 205, such as paper, cardboard, plastic, metal, foam, or some combination thereof. In some cases, certain stands may be made of a plastic such polyvinyl chloride (PVC) to avoid detection by certain types of range sensors, such as radar, which detect metal better than plastic.

The targets and/or support structures 720 may in some cases be motorized, and as such, the target control system 770 may include motors and actuators 774 that it can use to move the targets, for example as requested by the vehicle 102 to optimize calibration. For example, the target support structures may include a robotic arm with ball joints and/or hinge joints that may be actuated using the motors and actuators 774 to translate a target in 3D space and/or to rotate a target about any axis. The motors and actuators 773 may alternately only control a single type of movement for a particular target, for example by enabling a target to rotate about the rod of a stand 410. The target support structure 772 may also include wheels or legs, which may be actuated by the motors 774 to enable the entire target support structure 772 to move, and with it, the target(s) it supports. The target control system 770 includes one or more computing devices 776 and one or more wired and/or wireless transceivers 778, through which it may interact with the vehicle 102, the dynamic scene control bridge 710, or any other element in the architecture 700.

The scene surveying system 610 includes a surveying device support structure 780, such as a tripod or any other structure discussed with respect to the target support structure 772, and one or more sensors 782 coupled to the support structure 780. The sensors 782 of the scene surveying system 610, like the sensors 180 of the vehicle 102, may include one or more cameras of any type (e.g., wide-angle lens, fisheye lens), one or more range sensors (e.g., radar, lidar, emdar, laser rangefinder, sonar, sodar), one or more infrared sensors, one or more microphones, or some combination thereof. Using these, the scene surveying system 610 can capture a representation of the entire dynamic scene, including the vehicle 102, allowing determination of distances between the vehicle 102 and various targets. In some cases, either the vehicle 102 or the scene surveying system 610 or both may request adjustment of lighting through the lighting system 760 and/or adjustment of target positioning via the target control system 770. The scene surveying system 610 includes one or more computing devices 784 and one or more wired and/or wireless transceivers 786, through which it may interact with the vehicle 102, the dynamic scene control bridge 710, or any other element in the architecture 700. In some cases, feature tracking and/or image recognition techniques applied using the computing device 784 may be used with the a camera and/or the radar, lidar, sonar, sodar, laser rangefinder, and/or other sensors 782 of the scene surveying system 610 to identify when the platform 420 has no vehicle 102 on it, when the vehicle 102 is on the platform 420, when the vehicle 102 in a defined position on the platform (e.g., optionally as guided by guide railings on the platform), when the platform 420 and/or the vehicle 102 have begun rotating from a stopped position, and/or when the platform 420 and/or the vehicle 102 have stopped rotating. The scene surveying system 610 may then automatically communicate one or more signals or messages through wired and/or wireless communication interfaces to the bridge 710, vehicle 102, and/or motorized turntable system 405 to convey any of these observations/detections/ identifications by the scene surveying system 610, which may be used to trigger various actions, such as rotation or stop of rotation of the turntable 405, collection of sensor data or stop of collection of sensor data at the vehicle 102, or some combination thereof. In some cases, the scene surveying system 610 may simply be referred to as a camera or as another sensor that the scene surveying system 610 includes.

Figure 8A:
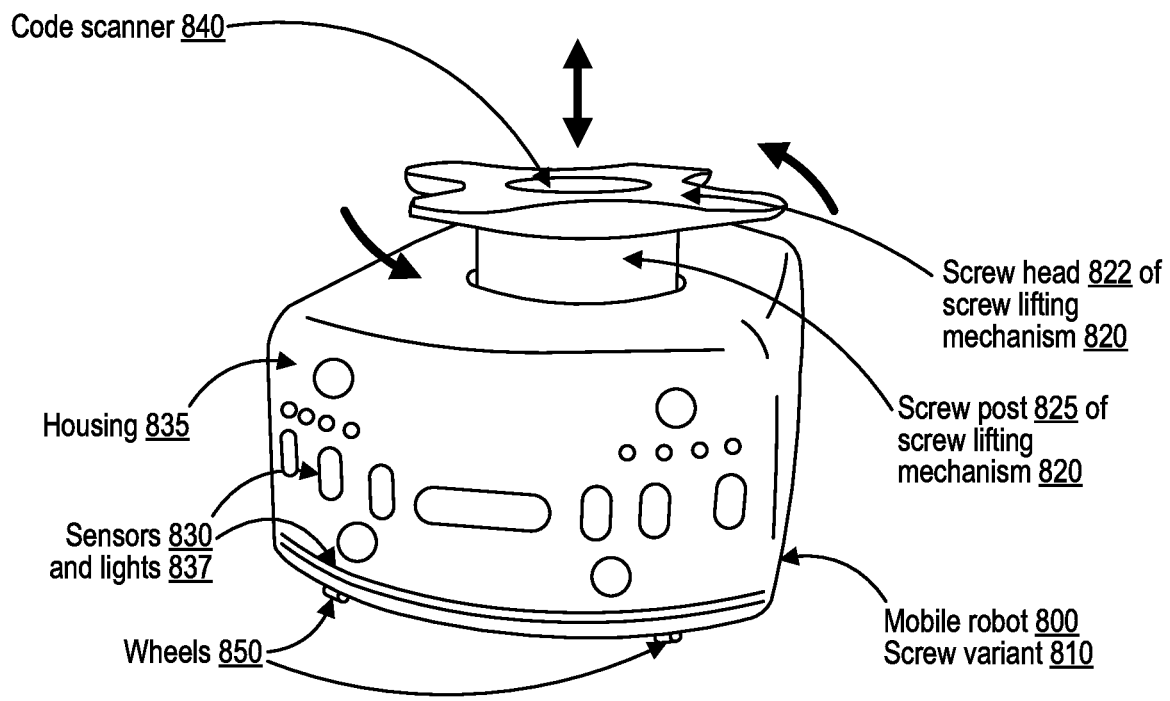
FIG. 8A illustrates a mobile robot with a screw lifting mechanism that is used for setup and/or takedown of a calibration scene.
Figure 8B:
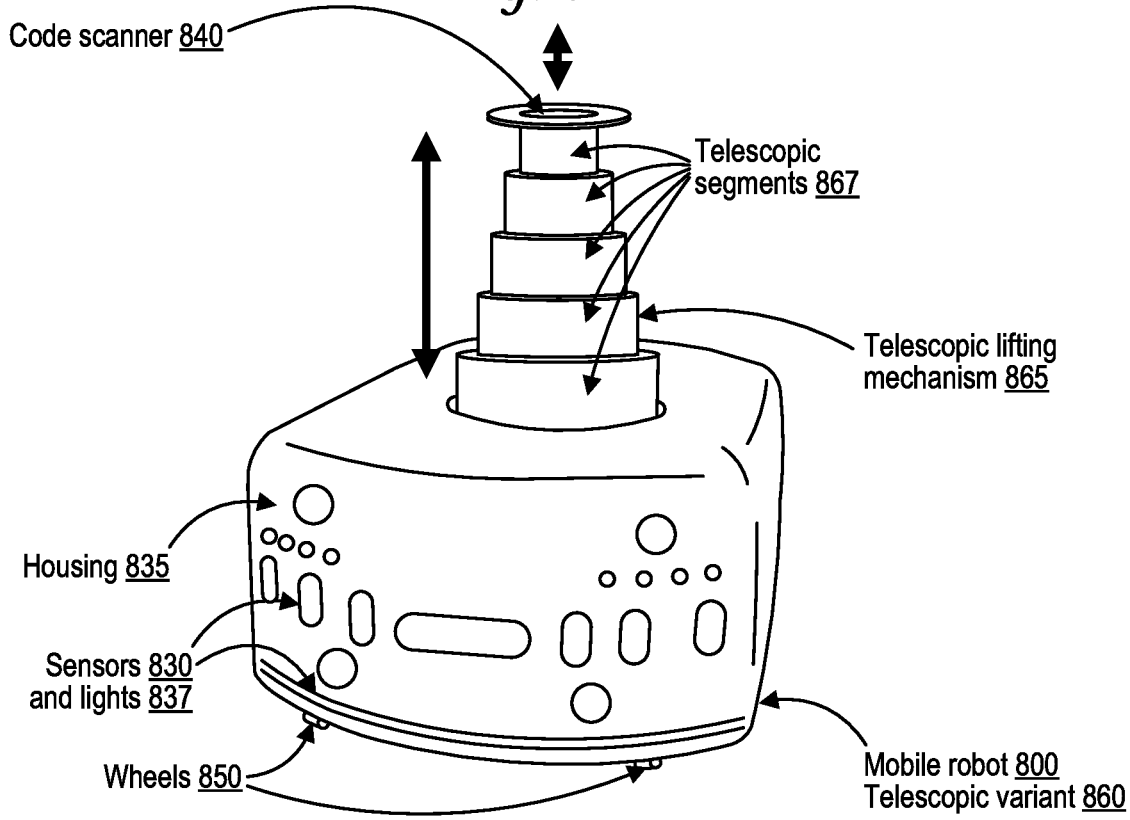
FIG. 8B illustrates a mobile robot with a telescopic lifting mechanism that is used for setup and/or takedown of a calibration scene.

The robotic scene control system 790 includes one or more mobile robots 788. Examples of the mobile robots 788 are illustrated as the mobile robots 800 of FIGS. 8A-B and 9A-C and 11, and as the mobile robots 1005A-C of FIG. 10A-B. The mobile robots 788 include various components. These components may include motors, actuators, and telescopic and/or screw lifting mechanisms 792. An example of a screw lifting mechanism 820 is illustrated in FIG. 8A. An example of a telescopic lifting mechanism 865 is illustrated in FIG. 8B. The components may include sensors 794. The sensors 794 may include any combination of the sensors 830 discussed with respect to FIGS. 8A-B, the sensors 180 of the vehicle, the sensors 782 of the scene surveying system 610, or some combination thereof. The components may include one or more controllers 795 and/or computing devices 796 inside the mobile robots 788 and/or exterior to the mobile robots 788, which may be used to guide the mobile robots 788 autonomously. The components may include may further include one or more wireless transceivers 798, through which the mobile robots 788 may interact with one another, with the vehicle 102, the dynamic scene control bridge 710, or any other element in the architecture 700.

The power supply system 702 may include batteries, generators, or may plug into an outlet and into the power grid. The power supply system 702 may supply power to the various elements and components of the system architecture 700, including at least the dynamic scene control bridge 710, the motorized turntable system 450, the lighting system 760, the target control system 770, and the scene surveying system 610. The power supply system 702 may also charge the vehicle 102 before, during, and/or after calibration, for example if the vehicle 102 is electric or hybrid. The power supply system 702 may also charge batteries of mobile robots 788 and/or power other systems of the robotic scene control system 790. The power supply system 702 may also intelligently scale voltage, amperage, and current as appropriate for each element and component of the system architecture 700, and to do so it may include a computing system 1800 (not pictured). It may also include a wired and/or wireless transceiver (not pictured) through which it may interact with the vehicle 102, the dynamic scene control bridge 710, or any other element in the architecture 700.

The computing devices 110, 715, 745, 764, 776, and 784 may each, at least in some cases, include at least one computing system 1800 as illustrated in or discussed with respect to FIG. 18, or may include at least a subset of the components illustrated in FIG. 18 or discussed with respect to computing system 1800.

FIG. 8A illustrates a mobile robot with a screw lifting mechanism that is used for setup and/or takedown of a calibration scene.

The mobile robot 800 of FIG. 8A includes a housing 835 with a number of sensors 830 integrated into the housing 835. The sensors 830 may include, for example, cameras, infrared sensors, touch-sensitive bumpers, LIDAR systems, RADAR systems, EmDAR systems, SONAR systems, SODAR systems, GNSS receivers, accelerometers, gyroscopes, inertial measurement units (IMU), infrared sensor systems, laser rangefinder systems, ultrasonic sensor systems, infrasonic sensor systems, microphones, any other sensors discussed herein such as sensors 180 of the vehicle 120, or a combination thereof. Such sensors 830 may be used by the mobile robot 800 to detect its environment and to stop or redirect the mobile robot 800 if the mobile robot 800 bumps into or comes within a threshold distance of a person or object. The housing 835 may also include lights 837 that the mobile robot 800 may automatically turn on to illuminate the environment that the mobile robot 800 is in (e.g., with visible, infrared, and/or ultraviolet light), for example if the environment is dark enough to impede optimal camera function. The housing 835 may also include The mobile robot 800 of FIG. 8A is a screw variant 810 that includes a screw lifting mechanism 820. The screw lifting mechanism 820 can move along a vertical path—up or down—based on rotation of a screw post 825 within a recess in the housing of the mobile robot 800. The screw post 825 of the screw lifting mechanism 820 may include screw threading (not pictured), and the recess may include a boss with threading that the screw threading of the screw post 825 interacts with. The screw post 825 of the screw lifting mechanism 820 may retract into the housing when the screw post 825 is rotated in one direction (e.g., clockwise) relative to the recess in the housing of the mobile robot 800, and the screw post 825 may extend outward from the housing when the screw post 825 is rotated in another direction (e.g., counter-clockwise) relative to the recess in the housing of the mobile robot 800. Thick arrows illustrated around the screw head 822 illustrate a counter-clockwise rotation. A thick double-sided arrow illustrated above the screw head 822 illustrates a vertical (up-down) movement of the screw portion of the screw lifting mechanism 820. When the screw post 825 extends outward from the housing, the screw head 822 of the screw lifting mechanism 820 may then be used to lift objects by pushing them upward. In some cases, the screw head 822 may include a clawed structure to grip or better come into contact with an object that the mobile robot lifts, such as a sensor target and/or a support structure for the sensor target. In some cases, while the screw rotates in one direction (e.g., counter-clockwise) to extend or retract the screw lifting mechanism 820, the mobile robot 800 may use its wheels 850 to rotate in the opposite direction (e.g., clockwise) in order to prevent rotation of the screw head 822 and therefore the object being lifted by the screw head 822.

The screw head 822 of the screw lifting mechanism 820 may include a code scanner 840 that faces upward. The code scanner may include, for example, one or more cameras, bar code scanners, laser scanners, scanners of other codes, or a combination thereof. Codes that may be scanned by the code scanner 840 may include bar codes, quick response (QR) codes, ArUco codes, Aztec codes, Semacodes, Data Matrix codes, PDF417 codes, MaxiCodes, Shotcodes, High Capacity Color Barcodes (HCCB), or combinations thereof. The code scanner 840 may face upward and may scan downward-facing codes attached or printed on the bottom of an object that the mobile robot 800 is preparing to lift with the screw lifting mechanism 820, such as the mounting platform 920 of FIGS. 9A-C. The codes may encode an identifier, such as a name and/or number, that identifies the object to which they are coupled. The mobile robot 800 may use the code scanner 840 to identify which object that the mobile robot 800 is underneath and in position to lift, or to confirm that the object that the mobile robot 800 is in position to lift using the screw lifting mechanism 820 (and to move by driving with the object lifted) is the object that the mobile robot 800 has been requested to lift and/or move. For example, each sensor target may have a different code encoding a different identifier, and the mobile robot 800 may use the code scanner 840 to identify a particular sensor target FIG. 8B illustrates a mobile robot with a telescopic lifting mechanism that is used for setup and/or takedown of a calibration scene.

The mobile robot 800 of FIG. 8B includes a housing 835 with sensors 830, lights 837, wheels 850, and other components illustrated in the mobile robot 800 FIG. 8A. The mobile robot 800 of FIG. 8B is a telescopic variant 860, in which the screw lifting mechanism 820 of the screw variant 810 is replaced with a telescopic lifting mechanism 865. The telescopic lifting mechanism 865, in a retracted state (illustrated in FIG. 9A and FIG. 9B), is retracted into a recess in the housing 835 of the mobile robot 800. In an extended state (illustrated in FIG. 8B, FIG. 9C, FIG. 10, and FIG. 11), the telescopic lifting mechanism 865 extends upward from the housing 835. To transition from the retracted state to the extended state, telescopic segments 867 (illustrated as cylinders in FIG. 8B) of the telescopic lifting mechanism 865 slide out from one another, lengthening the telescopic lifting mechanism 865. In some cases, the telescopic segments 867 may be another shape, such as a polygonal prismic shape (e.g., triangular prism, rectangular prism, pentagonal prism, hexagonal prism, septagonal prism, octagonal prism, and so forth). Thick double-sided arrows illustrated above the top (inner-most) telescopic segment 867 and to the left of the entire telescopic lifting mechanism 865 illustrate a vertical (up-down) movement of the telescopic lifting mechanism 865 and extension of the telescopic lifting mechanism 865 from a retracted state, respectively.

Like the screw head 822 of the screw lifting mechanism 820 of FIG. 8A, the top (inner-most) telescopic segment 867 of the telescopic lifting mechanism 865 may include a code scanner 840 that faces upward and may scan downward-facing codes attached or printed on the bottom of an object that the mobile robot 800 is preparing to lift with the telescopic lifting mechanism 865, such as the mounting platform 920 of FIGS. 9A-C. The mobile robot 800 may use the code scanner 840 to confirm that the object that the mobile robot 800 is preparing to lift using the telescopic lifting mechanism 865 (and move) is the object that the mobile robot 800 has been requested to lift (and move).

Both the screw lifting mechanism 820 of FIG. 8A and the telescopic lifting mechanism 865 of FIG. 8B may be activated to move from their respective retracted states to their respective extended states via one or more actuators and/or motors. The one or more actuators and motors may include brushed DC electric motors, brushless DC electric motors, AC electric motors, combustion engines, hydraulic motors, pneumatic motors, pumps, pistons, pressure control valves, flow control valves, direction control valves, gears, pulleys, or combinations thereof. Such motors may be used to rotate the screw of the screw lifting mechanism 820 in order to move the screw head 822 up and down, or to push or pull on telescopic segments 867 of the telescopic lifting mechanism 865 to extend or retract the telescopic lifting mechanism 865. Such motors and/or actuators may also be used to spin the wheels 850 to allow the mobile robot 800 to drive, or to rotate the wheels 850 to guide the direction of the mobile robot 800's driving.

FIG. 9A illustrates a mobile robot approaching a target stand.

The mobile robot 800 of FIG. 9A is of the telescopic variant 860 that is also illustrated in FIG. 8B. The telescopic lifting mechanism 865 of the mobile robot 800 of FIG. 9A is in the retraced state in which at least a majority of the telescopic lifting mechanism 865 is retracted into the housing 835 of the mobile robot 800. The mobile robot 800 of FIG. 9A drives along a path 910 that leads the mobile robot 800 toward and eventually underneath a mounting platform 920, which is illustrated as a small table that acts as a base to which two sensor targets are coupled via a pole. In particular, a pole is affixed to the mounting platform 920, and the pole is affixed to a radar calibration target 220 and a combined extrinsic calibration target 250.

FIG. 9B illustrates a mobile robot underneath a target stand.

The mobile robot 800 of FIG. 9B is the same mobile robot 800 as in FIG. 9A, after having completed driving of the path 910, now resting underneath the "table" of the mounting platform 920 with its telescopic lifting mechanism 865 still retracted into the housing 830 of the mobile robot 800.

FIG. 9C illustrates a mobile robot lifting a target stand vertically using a telescopic lifting mechanism.

The mobile robot 800 of FIG. 9C is the same mobile robot 800 as in FIG. 9B after having extended the telescopic lifting mechanism 865 from the retracted state of FIGS. 9A and 9B into the extended state (that is also illustrated in FIG. 8B) by sliding telescopic segments 867 of the telescopic lifting mechanism 865 out of one another. By extending the telescopic lifting mechanism 865 from the retracted state into the extended state, the mobile robot 800 of FIG. 9C has lifted the mounting platform 920 vertically, and has therefore also lifted the radar calibration target 220 and the combined extrinsic calibration target 250 vertically.

The combined extrinsic calibration target 250 of FIGS. 9A-9C is illustrated as "askew," or having been rotated, about an axis perpendicular to the surface of the substrate 205 of the combined extrinsic calibration target 250. In some cases, the pole may include additional mechanisms, such as gears or motors, for which an interface is accessible at the bottom of the mounting platform 920. The mobile robot 800 can access this interface where the mobile robot 800 lifts the mounting platform 920. For example, the mobile robot 800 can activate a function of this interface by pressing a button of the interface with a motorized pushing element (e.g., located near the code scanner 840) of the mobile robot 800, or by rotating a gear of the interface with a motor (e.g., located near the code scanner 840) of the mobile robot 800. By activating a function of the interface, the mobile robot 800 can rotate the combined extrinsic calibration target 250 (or another target) about the axis perpendicular to the surface of the substrate 205 of the combined extrinsic calibration target 250 and/or about another axis.

The mobile robot 800 may further adjust the height of the sensor targets by making incomplete extensions or retractions of a partial length of the telescopic lifting mechanism 865. While the mobile robot 800 illustrated in FIGS. 9A-9C is a telescopic variant 860, it may alternately be a screw variant, and may similarly adjust the height of the sensor targets by making incomplete extensions or retractions of a partial length of the screw lifting mechanism 820. The mobile robot 800 may also rotate the sensor targets relative to an axis perpendicular to a surface that the mobile robot 800 is resting or driving on by turning the body of the mobile robot 800 itself using the wheels 850, or by rotating the screw lifting mechanism 820 or a turntable placed atop the top telescoping segments 867 of the telescopic lifting mechanism 865.

Figure 10:
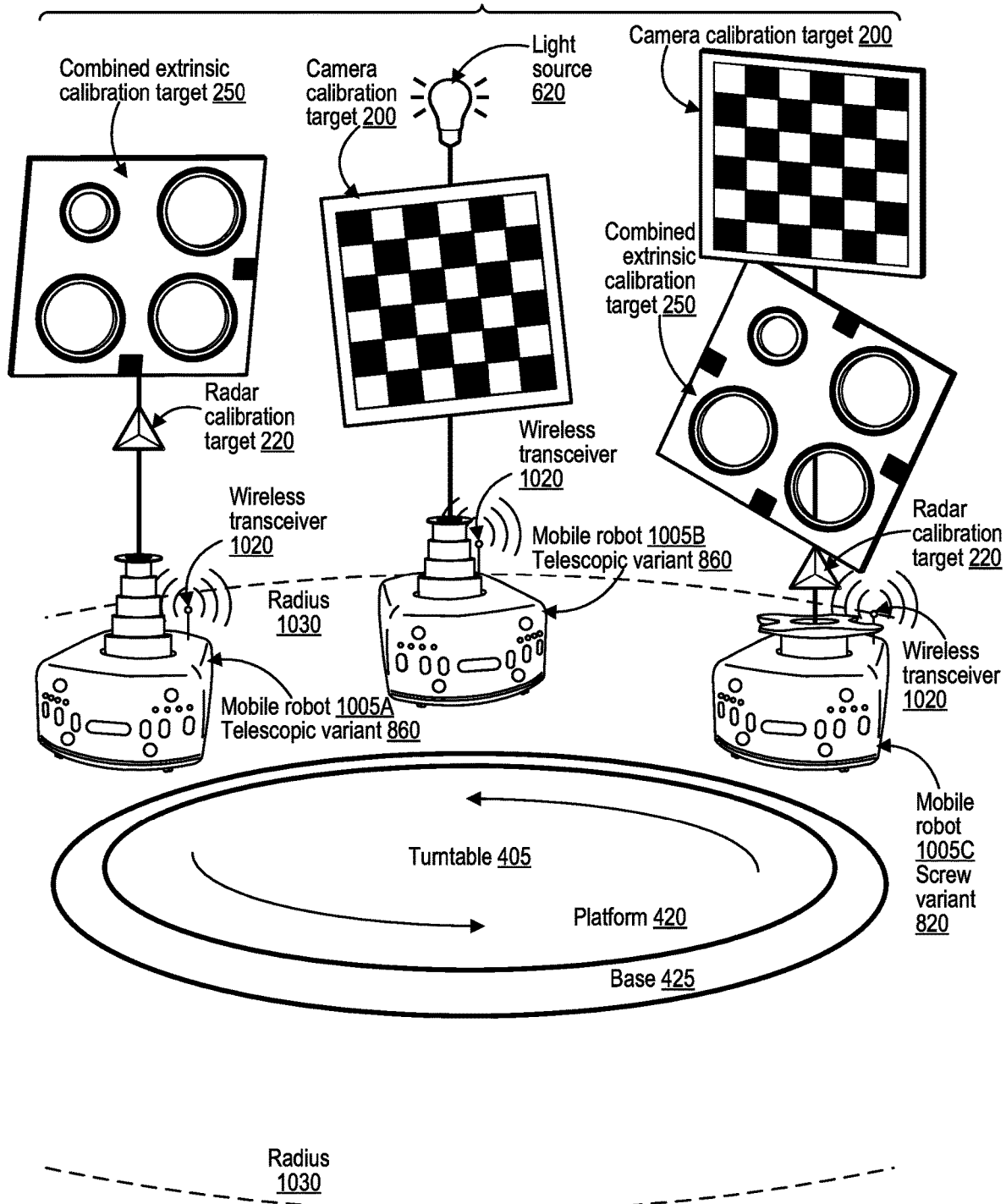
FIG. 10 illustrates a perspective view of a dynamic scene calibration environment that is set up using multiple mobile robots coupled to sensor targets.

FIG. 10 illustrates a perspective view of a dynamic scene calibration environment that is set up using multiple mobile robots coupled to sensor targets.

The dynamic scene calibration environment 1000 illustrated in FIG. 10 uses mobile robots 1005A-C to carry various sensor targets but is otherwise similar to the dynamic scene calibration environments 400, 500, and 600 of FIGS. 4, 5, and 6, respectively. The mobile robots 1005A-C are mobile robots 800 with wireless transceivers 1020 and carrying various sensor targets. The mobile robots 1005A-C include a mobile robot 1005A of the telescopic variant 860 carrying a combined extrinsic calibration target 250 and a radar calibration target 220, a mobile robot 1005B of the telescopic variant 860 carrying a camera calibration target 200 and a light source 620, and a mobile robot 1005C of the screw variant 820 carrying a camera calibration target 200 and a combined extrinsic calibration target 250 and a radar calibration target 220. All three mobile robots 1005A-C have driven into positions located within a predetermined radius 1030 (e.g., 1 foot, 2 feet, 3 feet, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, more feet, or some number in between any two of the listed values; 1 meter, 1.5 meters, 2 meters, 2.5 meters, 3 meters, 3.5 meters, 4 meters, 4.5 meters, 5 meters, more meters, more feet, or some number in between any two of the listed values) of the turntable 405 before a calibration process for calibrating the sensors 180 of the vehicle 102 (such as the calibration processes illustrated in any of FIG. 13, 14, 15, or 16) begins. In some cases, setup of the calibration environment 1000 by the mobile robots 1005A-C may be verified by a vehicle 102

The wireless transceivers 1020 are illustrated with antennae and may include personal area network (PAN) transceivers, such as Bluetooth® transceivers. The wireless transceivers 1020 may in some cases include wireless transceivers 1020 meeting the technical specifications of Bluetooth® version 5.0, 5.1, or a newer version. The mobile robots 1005A-C may each communicate with one another using the wireless transceivers 1020 to determine each mobile robot 1005's positioning relative to the other mobile robots 1005—that is, to determine locations, directions, angles, pitch, yaw, elevation, and other positioning information relative to the other mobile robots 1005. The mobile robots 1005A-C may optionally also communicate using the wireless transceivers 1020 with one or more external devices, such as Bluetooth® or iBeacon® poisoning beacon devices, again to determine positioning relative the external devices—including to determine locations, directions, angles, pitch, yaw, elevation, and other positioning information relative to the external devices. Such external devices may optionally be included in, or coupled to, the turntable 405, the vehicle 102, the scene surveying system 610, each sensor target, each sensor target support structure, the dynamic scene control bridge 710, each light source 620, the power supply system 705, and so forth. Relative positioning may be determined in part based on multilateration techniques, such as arrival times of one or more signals, departure times of one or more signals, phase shifts of one or more signals, angles of arrival (AoA) of one or more signals, angles of departure (AoD) of one or more signals, various other indoor positioning system (IPS) techniques, or some combination thereof. Positioning may also be based on data from GNSS receivers.

In some cases, the mobile robots 1005A-C may be trained by being manually positioned a first time, or a first few times, in appropriate positions within the radius 1030 around the turntable 405. The mobile robots 1005A-C may then remember their positions relative to one another and/or to one or more external devices while the mobile robots 1005A-C are at those appropriate positions. This manual positioning and training may be performed multiple times in different environments so that the mobile robots 1005A-C are not deterred from entering a correct position due to interference from background noise such as cellular signals or signals echoing from walls. In some cases, a machine learning algorithm may be used by the mobile robots 1005A-C and may be trained based on the training data from these manual positioning setups. Once trained, the mobile robots 1005A-C may then be used to set up a dynamic scene calibration environment 1000 from scratch by themselves. To do so, the mobile robots 1005A-C may lift up appropriate cargo (sensor targets, light sources, etc.) and seek out appropriate positions within the radius 1030 around the turntable 405 once again by seeking out similar relative positions to the other mobile robots 1005A-C and/or to one or more external devices that the mobile robots 1005A-C recorded during the training. The mobile robots 1005A-C may share training data for the different positions, so that each mobile robot 1005 can be used to fill any of the positions and carry any of the cargo objects, in case one of the mobile robots 1005A-C is damaged and/or needs to be repaired, replaced, or needs a battery charge or replacement.

In some cases, the

The wireless transceivers 1020 may include any type of wireless signal transceiver, such as one or more Bluetooth® transceivers, Bluetooth® low energy (BLE) transceivers, iBeacon® transceiver, radio-frequency identification (RFID) transceivers, near-field communication (NFC) transceivers, dedicated short range communication (DSRC) transceivers, 802.11 Wi-Fi transceivers, wireless local area network (WLAN) transceivers, Visible Light Communication (VLC) transceivers, Worldwide Interoperability for Microwave Access (WiMAX) transceivers, Public Switched Telephone Network (PSTN) transceivers, Integrated Services Digital Network (ISDN) transceivers, 3G/4G/5G/LTE cellular transceivers, ad-hoc network transceivers, radio wave transceivers, microwave transceivers, infrared signal transfer, visible light transceivers, ultraviolet light transceivers, wireless signal transceivers along another range of the electromagnetic spectrum, or some combination thereof.

The sensor targets 200/220/250 and light source 620 of the dynamic scene calibration environment 1000 are mounted more directly to a slot in the lifting mechanisms (the screw lifting mechanisms 820 or telescopic lifting mechanisms 860 respectively) of the mobile robots 1005A-C, rather than being mounted to a mounting platform 920 that is the lifted by the lifting mechanisms of FIGS. 9A-C. While use of a mounting platform 920 as in FIGS. 9A-C can allow mobile robots 800 to more autonomously pick up and swap out their cargo (sensor targets, light sources, etc.), a mounting system such as the one in FIG. 10 can be used in which a user slides the desired cargo (pole affixed to sensor targets, light sources, etc.) into a slot in the lifting mechanisms of the mobile robots 1005A-C, and the mobile robots 800 optionally includes a system that clamps down on the pole or other portion of the cargo that is inserted into the slot once it is in the slot to prevent unwanted movement of the cargo. In some cases, one or more of the mobile robots 1005A-C may instead use one or more robotic arms (not pictured) to pick up and manipulate the positioning of the cargo.

Figure 11:
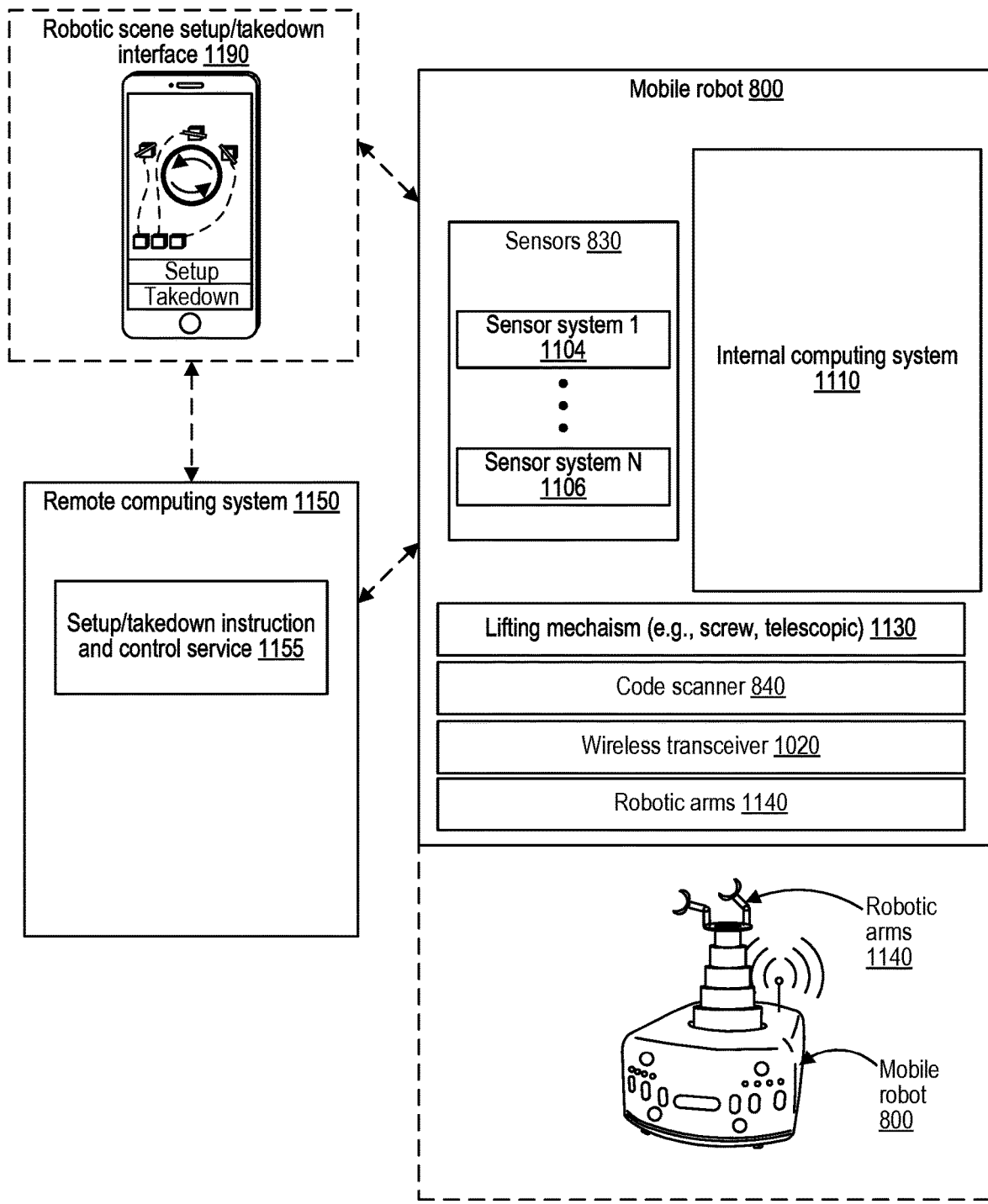
FIG. 11 illustrates an architecture of a mobile robot used for setup and/or takedown of a calibration environment.

FIG. 11 illustrates an architecture of a mobile robot used for setup and/or takedown of a calibration environment.

The mobile robot 800 includes a plurality of sensor systems 830 (a first sensor system 1104 through an Nth sensor system 1106). The sensor systems 180 may be of different types as discussed previously and are arranged about the housing 835 of the mobile robot 800. The mobile robot 800 may include an internal computing system 1110, which may include any elements discussed previously with respect to the internal computing system 110 of the vehicle 102, such as the control service 112, the constraint service 114, the communication service 116, the latency service 118, and the user interface service 112. The mobile robot 800 may include other elements discussed previously with respect to the vehicle 102, such as the vehicle propulsion system 130, the braking system 132, the steering system 134, and the safety system 138.

The mobile robot 800 also includes a lifting mechanism 1130, such as the screw lifting system 820 of FIG. 8A or the telescopic lifting system 865 of FIG. 8B. The mobile robot 800 also includes a code scanner 840 and one or more wireless transceivers 1020. In some cases, the mobile robot 800 may also include one or more robotic arms 1140, which the mobile robot 800 may use to secure its cargo (e.g., one or more sensor targets, light sources 620, scene surveying system 610, etc.) to itself. Two example robotic arms are illustrated in an illustration of the mobile robot 800 in FIG. 11.

A remote computing system 1150 may also be part of the robotic scene control system 790. The remote computing system 1150 may communicate wirelessly with the internal computing system 1110 of the mobile robot 800. The remote computing system 1150 may be similar to the remote computing system 150 of FIG. 1, and may similarly include an analysis service 152, instruction service 156, and user interface 154. The remote computing system 1150 may include a setup/takedown instruction and control service 1155 with a robotic scene setup/takedown user interface 1190 that a user may access through a mobile device, for example to send the setup and takedown commands of steps 1205 and 1225 of FIGS. 12A and 12B. The setup/takedown instruction and control service 1155 may perform any of the tasks discussed with respect to FIG. 12A, 12B, 17A, or 17B, such as receiving the setup and takedown commands, generating and sending the wireless setup and takedown signals, receiving the setup and takedown confirmation signals, and initiating or otherwise triggering the calibration procedures and/or validation procedures.

Figure 12A:
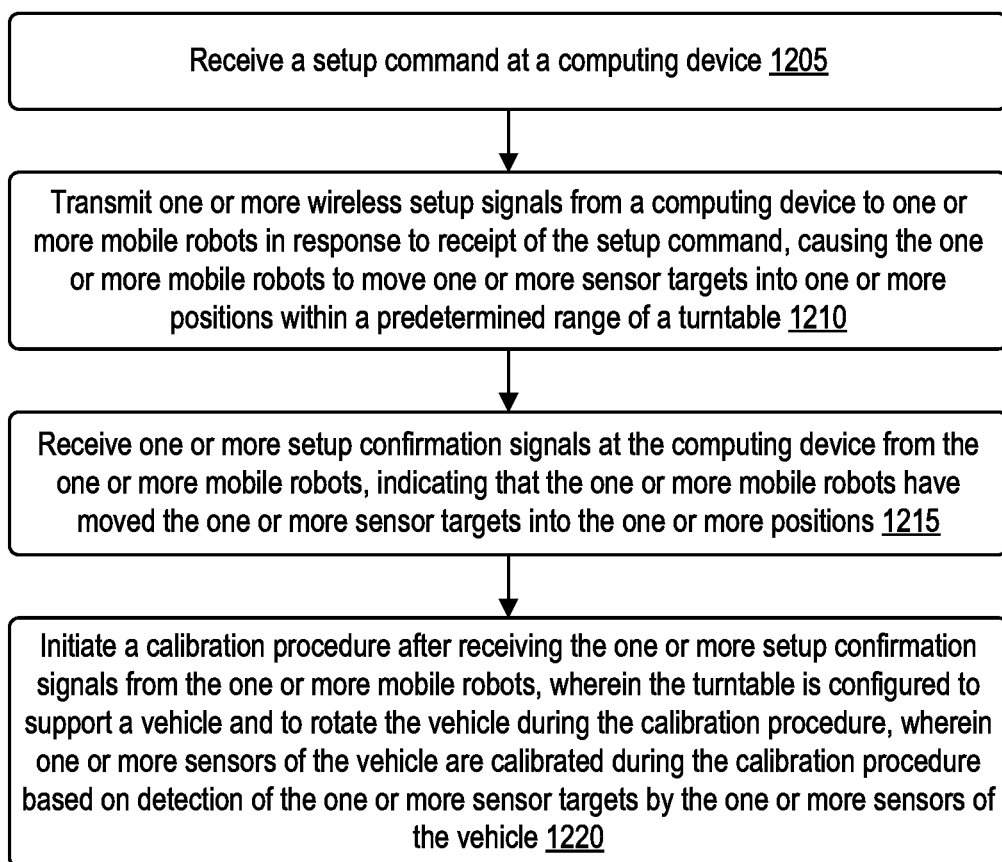
FIG. 12A is a flow diagram illustrating an automated calibration environment setup process using one or more mobile robots.

FIG. 12A is a flow diagram illustrating an automated calibration environment setup process using one or more mobile robots.

At step 1205, a computing device 1800 such as the dynamic scene control bridge 710, the remote computing system 1150, or another computing device 796 of the robotic scene control system 790 receives a setup command. At step 1210, the computing device generates one or more wireless setup signals based on the setup command, and transmits the one or more wireless setup signals to one or more mobile robots 800 in response to receipt of the setup command. Transmission of the wireless setup signals from the computing device, and receipt of the wireless setup signals by the one or more mobile robots 800, causes the one or more mobile robots 800 to move one or more sensor targets (and optionally one or more light sources 620) into one or more positions within a predetermined range 1030 of a turntable 405. The mobile robots 800 may do so based on previous training data. The mobile robots 800 may do so based on wireless transceivers that the mobile robots 800 use to identify their positioning relative to other mobile robots 800 or other external devices. The mobile robots 800 may adjust a height of the one or more sensor targets (and optionally one or more light sources 620) based on a height of the vehicle 102 and/or a height at which one or more sensors 180 are mounted on the vehicle. Once each mobile robot 800 believes that it, and the sensor targets and/or light sources 620 it carries, are in the correct position, the mobile robot 800 may send a confirmation signal to the computing device.

At step 1215, the computing device receives one or more setup confirmation signals at the computing device from the one or more mobile robots, indicating that the one or more mobile robots have moved the one or more sensor targets (and optionally the light sources 620) into the one or more positions.

At step 1220, the computing device initiates a calibration procedure after receiving the one or more setup confirmation signals from the one or more mobile robots. The turntable 405 is configured to support a vehicle 102 and to rotate the vehicle 102 during the calibration procedure. One or more sensors 180 of the vehicle 102 are calibrated during the calibration procedure based on detection of the one or more sensor targets by the one or more sensors 180 of the vehicle 102. The calibration procedure may be any of the calibration procedures illustrated in any of FIG. 13, 14, 15, 16, 17A, or 17B.

In some cases, a vehicle 102 may be used for validation that the calibration environment is set up accurately—that is, that the mobile robots 800 are in the correct positions and are holding the sensor targets and/or light sources 620 at the correct positions, angles, and heights. The vehicle 102 may be a vehicle 102 that was previously calibrated at a calibration environment that was known to be set up properly (e.g., a manually set up calibration environment) and is therefore known to be working correctly. The vehicle 102 may drive onto the platform 420 of the turntable 405 and may be rotated about the base 425 of the turntable 405. If the positioning of any of the light sources is improper or otherwise suboptimal, the process of FIG. 17A may be initiated to correct the positioning of the light sources, optionally via one or more of the mobile robots 800. If the positioning of any of the sensor targets is improper or otherwise suboptimal, the process of FIG. 17B may be initiated to correct the positioning of the sensor targets, optionally via one or more of the mobile robots 800. In some cases, a scene surveying system 610 that has previously seen a correctly set up calibration environment may likewise be used for validation that the calibration environment is set up accurately. In some cases, a mobile robot 800 may be used to carry the scene surveying system 610.

In some cases, a vehicle 102 or the scene surveying system 610 may be used to request changes to a position of a sensor target and/or a light source 620 during calibration, either because an issue in the positioning only occurred during or right before the calibration process (e.g., a target moved or detached from a pole or other support structure carried by the mobile robot 800), an issue in the positioning was only noticed during the calibration process (e.g., validation was performed using a vehicle with slightly different dimensions or sensor positions), or because a sensor target or light source 620 was intended to be dynamic/moving during calibration in order to calibrate the sensor 180 of the vehicle 102 in conditions with moving targets and/or variable lighting.

In some cases, the mobile robots 800 may each have elevation sensors, and may be able to determine that the surface on which they are driving/standing is slanted slightly or is otherwise uneven. In such a case, each mobile robots 800 may adjust the height if its cargo to compensate for the slope (e.g., raising it higher if the mobile robot 800 is at the bottom of a slope or in a dip, or lowering it if the mobile robot 800 is at the top of a slope or on a hill).

Figure 12B:
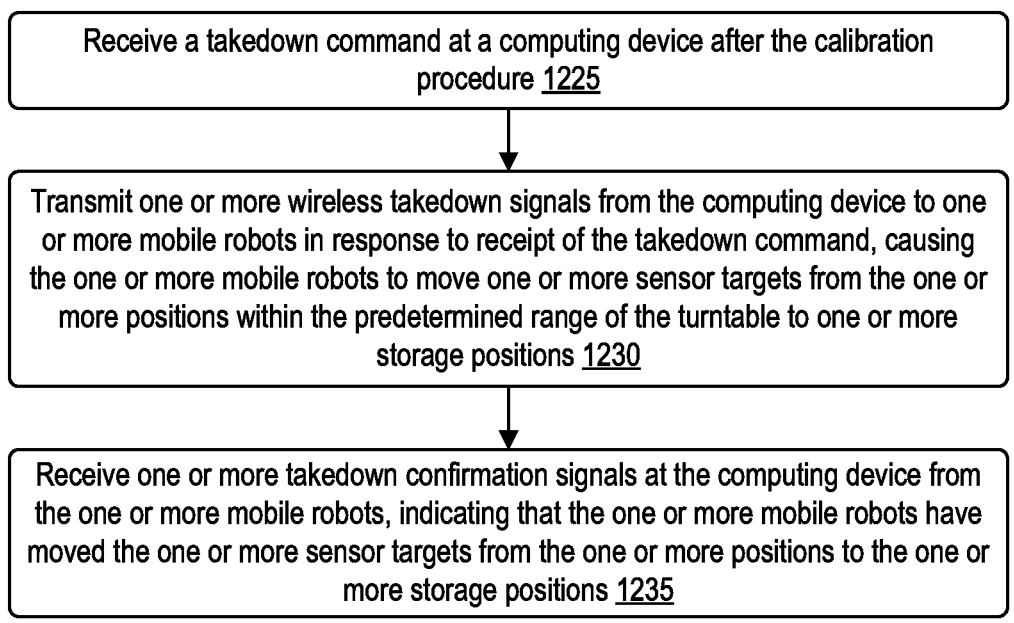
FIG. 12B is a flow diagram illustrating an automated calibration environment takedown process using one or more mobile robots.

FIG. 12B is a flow diagram illustrating an automated calibration environment takedown process using one or more mobile robots.

Often, once the mobile robots 800 set up a calibration environment, they will hold their position for a long period of time. However, sometimes, a user wishes to take down a calibration environment, for example to move the calibration environment to a new location, to upgrade/repair/replace certain sensor targets or light sources 620 or mobile robots 800, to add new sensor targets or light sources 620, to allow mobile robots 800 to charge their batteries, or some combination thereof.

At step 1225, the computing device discussed in FIG. 12A receives a takedown command, optionally after a calibration procedure is complete (or at least after the setup of FIG. 12A is complete). At step 1230, the computing device generates \ one or more wireless takedown signals based on the takedown command, and transmits the one or more wireless takedown signals to one or more mobile robots 800 in response to receipt of the takedown command. Transmission of the wireless takedown signals from the computing device, and receipt of the wireless takedown signals by the one or more mobile robots 800, causes the one or more mobile robots 800 to move one or more sensor targets (and optionally one or more light sources 620) from the one or more positions within the predetermined range 1030 of the turntable 405 to storage positions, which may be predetermined. The mobile robots 800 may also store themselves in storage positions. Storage positions may also be positions with battery charger or battery replacement mechanisms that may charge or replace the batteries of the mobile robots 800. Once each mobile robot 800 believes that it, and the sensor targets and/or light sources 620 it carries, are in the storage positions, the mobile robot 800 may send a confirmation signal to the computing device.

At step 1235, the computing device receives one or more takedown confirmation signals at the computing device from the one or more mobile robots, indicating that the one or more mobile robots have moved the one or more sensor targets (and optionally the light sources 620) into the one or more storage positions.

Figure 13:
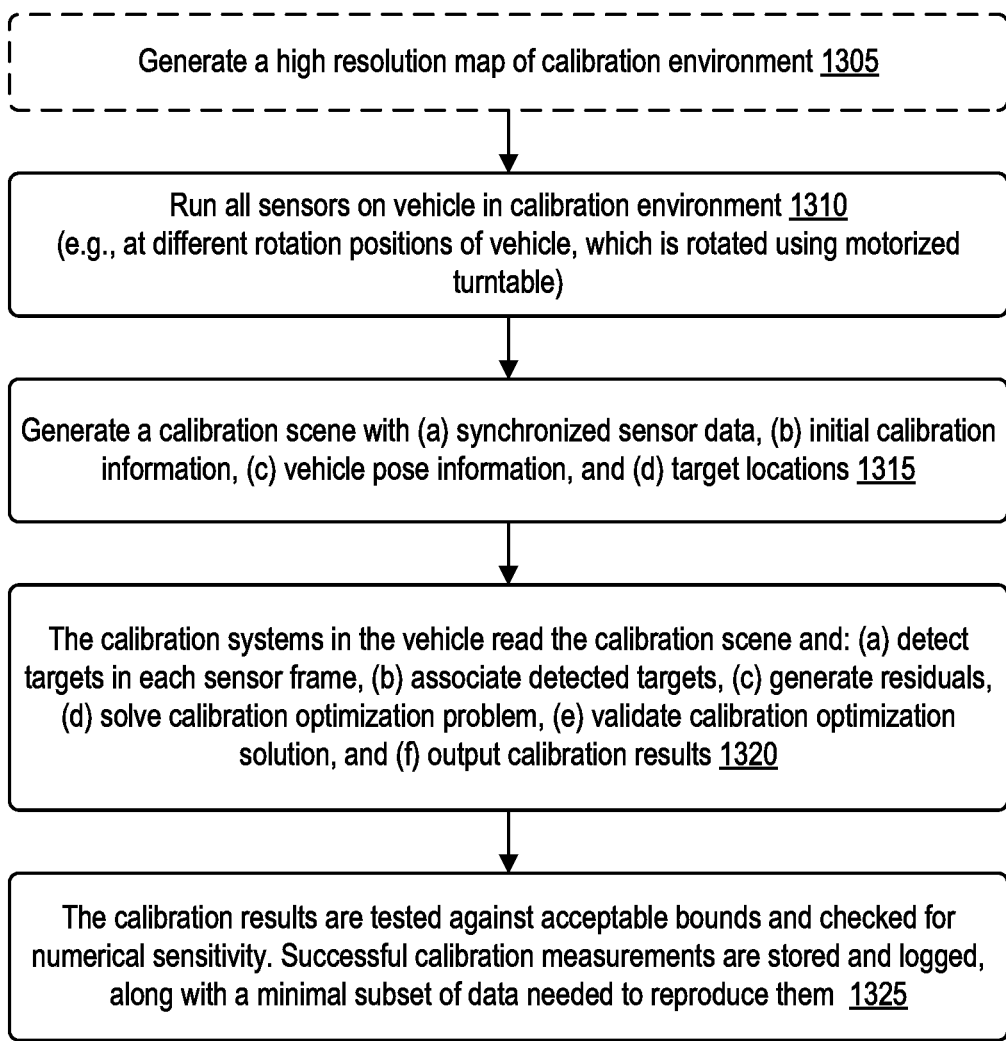
FIG. 13 is a flow diagram illustrating operation of a calibration environment.

FIG. 13 is a flow diagram illustrating operation of a calibration environment.

At step 1305, a high resolution map of calibration environment is generated. This may be performed using the scene surveying system 610, for example.

At step 1310, all sensors 180 on the vehicle 102 are run in the calibration environment, for example at different rotation positions of the vehicle 102, which is rotated using motorized turntable 405. At step 1315, the vehicle 102 generates a calibration scene based on its sensors 180, based on (a) synchronized sensor data, (b) initial calibration information, (c) vehicle pose information, and (d) target locations.

Figure 14:
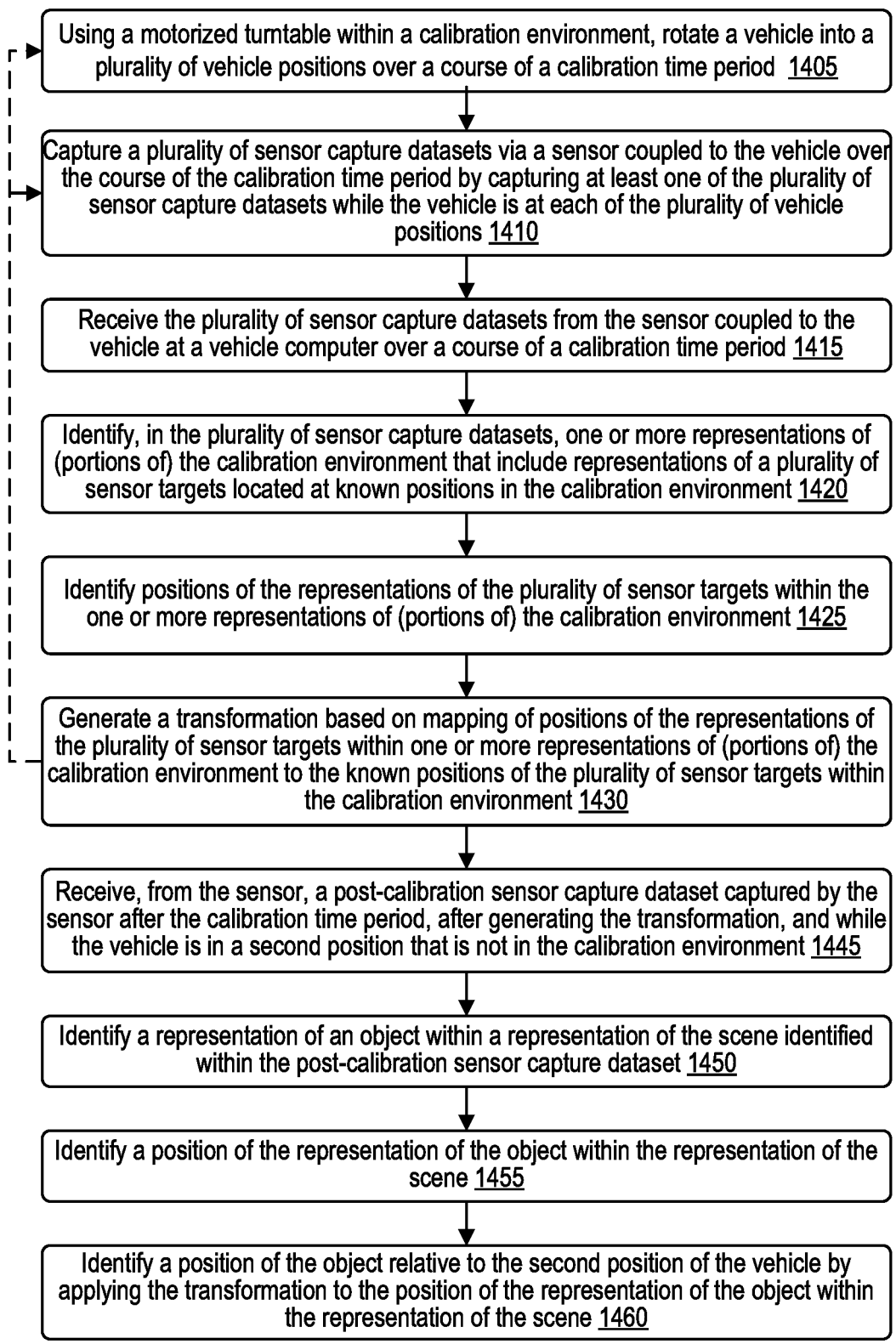
FIG. 14 is a flow diagram illustrating operations for intrinsic calibration of a vehicle sensor using a dynamic scene.

At step 1315, the calibration systems in the vehicle read the calibration scene and: (a) detect targets in each sensor frame, (b) associate detected targets, (c) generate residuals, (d) solve calibration optimization problem, (e) validate calibration optimization solution, and (f) output calibration results. At step 1325, the calibration results are tested against acceptable bounds and checked for numerical sensitivity. Successful calibration measurements are stored and logged, along with a minimal subset of data needed to reproduce them FIG. 14 is a flow diagram illustrating operations for intrinsic calibration of a vehicle sensor using a dynamic scene.

At step 1405, a vehicle 102 is rotated into a plurality of vehicle positions over a course of a calibration time period using a motorized turntable 405. The vehicle 102 and motorized turntable 405 are located in a calibration environment. At step 1410, the vehicle 102 captures a plurality of sensor capture datasets via a sensor coupled to the vehicle over the course of the calibration time period by capturing at least one of the plurality of sensor capture datasets while the vehicle is at each of the plurality of vehicle positions.

At step 1415, an internal computing system 110 of the vehicle 102 receives the plurality of sensor capture datasets from the sensor coupled to the vehicle over a course of a calibration time period. At step 1420, the internal computing system 110 of the vehicle 102 identifies, in the plurality of sensor capture datasets, one or more representations of (at least portions of) the calibration environment that include representations of a plurality of sensor targets. The plurality of sensor targets are located at known (i.e., previously stored) positions in the calibration environment. At steps 1425-1430, the sensor is calibrated based on the representations of a plurality of sensor targets identified in the plurality of sensor capture datasets.

More specifically, at step 1425, the internal computing system 110 of the vehicle 102 identifies positions of the representations of the plurality of sensor targets within the one or more representations of (at least portions of) the calibration environment. If the sensor being calibrated is a camera, and the one or more representations of (portions of) the calibration environment are images, then the representations of the sensor targets may be areas within the one or more images comprised of multiple pixels, which the computing system 110 of the vehicle 102 can identify within the one or more images by generating high-contrast versions of the one or more images (i.e., "edge" images) that are optionally filtered to emphasize edges within the image, and by identifying features within the image comprised of one or more of those edges, the features recognizable as portions of the target. For example, the vertices and/or boxes in the checkerboard pattern 210A or the ArUco pattern 210B, curves or vertices in the crosshair pattern 210C, the circular ring marking patterns 230, or combinations thereof, may each be visually recognized as features in this way. Similarly, if the sensor being calibrated is a radar sensor, the radar sensor may recognize the trihedral shape 215 of the target 220 as a feature due to its reflective pattern that results in a high radar cross section (RCS) return. Similarly, if the sensor being calibrated is a lidar sensor, the lidar sensor may recognize the surface of the substrate 205 of the target 250 and the apertures 225/240 within the substrate 205 of the target 250, which may be recognized as a feature due to the sharp changes in range/depth at the aperture.

At step 1430, the internal computing system 110 of the vehicle 102 generates a transformation that maps (1) the positions of the representations of the plurality of sensor targets within one or more representations of (portions of) the calibration environment to (2) the known positions of the plurality of sensor targets within the calibration environment. Other information about the plurality of sensor targets, such as information storing visual patterns or aperture patterns of the sensor targets, may also be used to generate the transformation. For example, if the sensor being calibrated is a camera, and the computing device 110 knows that an image should have a checkerboard pattern 210A of a sensor target 200A, and recognizes a warped or distorted variant of the checkerboard pattern 210A (e.g., because the camera includes a fisheye lens or wide-angle lens), then the computing device 110 may use its knowledge of the way that the checkerboard should look, such as how far the vertices are from each other, that they should form squares, and that the squares are arranged in a grid pattern—to generate a transformation that undoes the distortion caused by the camera, thereby mapping the vertices detected in the image to real-world positions, at least relative to one another. In other words, the transformation includes one or more projective transformations of various 2-D image coordinates of sensor target features into 3-D coordinates in the real world and optionally back into 2-D image coordinates that have been corrected to remove distortion and/or other sensor issues.

Because the computing device 110 knows ahead of time exactly where the sensor targets are in the calibration environment, the transformation may also map the positions of the vertices in the image (and therefore the positions of the representations of the sensor targets in the representation of the calibration environment) to real-world positions in the calibration environment. The transformation(s) that are generated during intrinsic sensor calibration at step 1430 can include one or more types of transformations, including translations, stretching, squeezing, rotations, shearing, reflections, perspective distortion, distortion, orthogonal projection, perspective projection, curvature mapping, surface mapping, inversions, linear transformations, affine transformations. The translational and rotational transformations may include modifications to position, angle, roll, pitch, yaw, or combinations thereof. In some cases, specific distortions may be performed or undone, for example by removing distortion caused by use of a specific type of lens in a camera or other sensor, such as a wide-angle lens or a fisheye lens or a macro lens.

Step 1430 may be followed by step 1405 and/or by step 1410 if calibration is not yet complete, leading to gathering of more sensor capture datasets and further refinement of the transformation generated at step 1430. Step 1430 may alternately be followed by step 1445.

The previously stored information about the plurality of sensor targets may be from a high-definition map generated as in step 1305 of FIG. 13, may be from a second sensor on the vehicle, or may simply be based on a prior understanding of the sensor targets. For example, the internal computing system 110 of the vehicle 102 understands what a checkerboard pattern 210A is and that the grid it forms ought to look include a grid of parallel and perpendicular lines under normal conditions. Because of this, the internal computing system 110 understands that if the representation it received from the sensor (camera) of a target with a checkerboard pattern 210A forms a grid warped or distorted by a wide-angle lens or fisheye lens, this difference (step 1430) can be corrected by the internal computing system 110 by correctively distorting or warping the image captured by the sensor (camera) by to reverse the warping or distortion in the representation until the corrected checkerboard looks like it should. This corrective warping or distortion is the correction generated in step 1435. The correction may also include a translation along X, Y, or Z dimensions, a rotation along any axis, a warp or distortion filter, a different type of filter, or some combination thereof Steps 1445-1460 concern operations that occur after calibration is complete (i.e., post-calibration operations). At step 1445, the sensor of the vehicle captures a post-calibration sensor capture dataset after the calibration time period, after generating the transformation, and while the vehicle is in a second position that is not in the calibration environment. At step 1450, the computing device 110 of the vehicle 102 identifies a representation of an object within a representation of a scene identified within the post-calibration sensor capture dataset. At step 1455, the computing device 110 of the vehicle 102 identifies a position of the representation of the object within the representation of the scene. At step 1460, the computing device 110 of the vehicle 102 identifies a position of the object relative to the second position of the vehicle by applying the transformation to the position of the representation of the object within the representation of the scene.

Note that capture of data by the sensors 180 of the vehicle 102 may occur in parallel with calibration of the sensors 180 of the vehicle 102. While an initial correction is generated at step 1435, the vehicle 102 may continue to rotate, and its sensors 180 may continue to capture more sensor data, hence the dashed lines extending back up to steps 1405 and 1410 from step 1435. When step 1435 is reached a second, third, or $N^{th}$ time (where N is any integer over 1), the correction generated the first time step 1435 was reached may be updated, revised, and/or re-generated based on the newly captured sensor data when step 1435 is reached again. Thus, the correction becomes more accurate as calibration continues.

For some additional context on intrinsic calibration: LIDAR intrinsic properties may include elevation, azimuth, and intensity. Camera intrinsic properties may be given as matrices based on camera region/bin, and may track projection, distortion, and rectification. All sensors' intrinsic properties (including LIDAR and camera) may include position in X, Y, and/or Z dimensions, as well as roll, pitch, and/or yaw.

Figure 15:
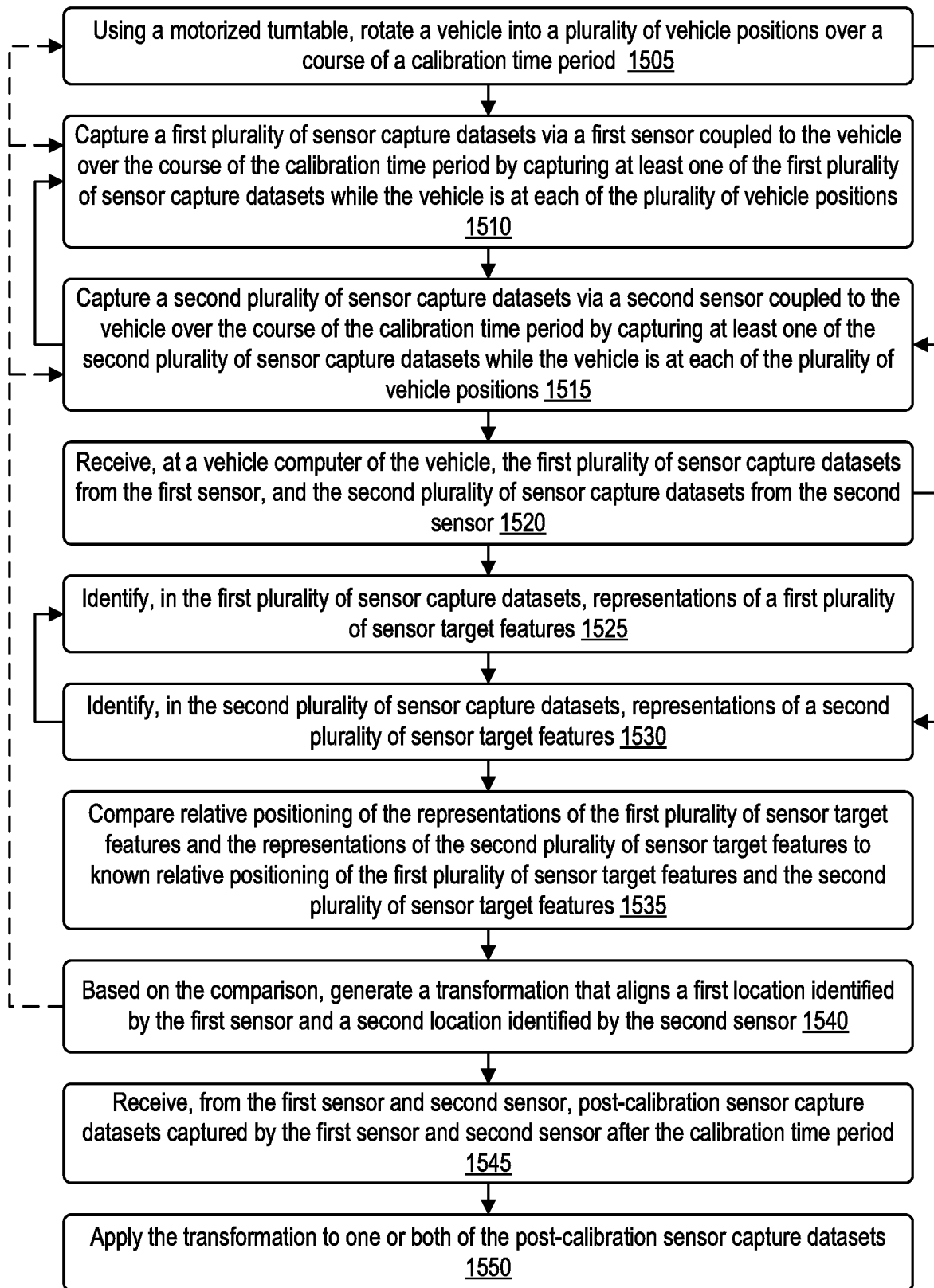
FIG. 15 is a flow diagram illustrating operations for extrinsic calibration of two sensors in relation to each other using a dynamic scene.

FIG. 15 is a flow diagram illustrating operations for extrinsic calibration of two sensors in relation to each other using a dynamic scene.

At step 1505, a vehicle 102 is rotated into a plurality of vehicle positions over a course of a calibration time period using a motorized turntable 405. At step 1510, the vehicle 102 captures a first plurality of sensor capture datasets via a first sensor coupled to the vehicle over the course of the calibration time period by capturing at least one of the first plurality of sensor capture datasets while the vehicle is at each of the plurality of vehicle positions. At step 1515, the vehicle 102 captures a second plurality of sensor capture datasets via a second sensor coupled to the vehicle over the course of the calibration time period by capturing at least one of the first plurality of sensor capture datasets while the vehicle is at each of the plurality of vehicle positions. Either of steps 1510 and 1515 can occur first, or they can occur at least partially in parallel.

At step 1520, the internal computing system 110 of the vehicle 102 receives the first plurality of sensor capture datasets from the first sensor and the second plurality of sensor capture datasets from the second sensor. At step 1525, the internal computing system 110 of the vehicle 102 identifies, in the first plurality of sensor capture datasets, representations of a first plurality of sensor target features, the first plurality of sensor target features detectable by the first sensor due to a type of the first plurality of sensor target features being detectable by sensors of a type of the first sensor. At step 1530, the internal computing system 110 of the vehicle 102 identifies, in the second plurality of sensor capture datasets, representations of a second plurality of sensor target features, the second plurality of sensor target features detectable by the second sensor due to a type of the second plurality of sensor target features being detectable by sensors of a type of the second sensor. Either of steps 1525 and 1530 can occur first, or they can occur at least partially in parallel.

The first plurality of sensor target features and the second plurality of sensor target features may be on the same targets; for example, if the first sensor is a camera, and the second sensor is a LIDAR sensor, and plurality of sensor targets are the combined extrinsic calibration targets 250 of FIGS. 2E and 5, then the first plurality of sensor target features may be the visual markings (rings) 230 detectable by the camera, while the second plurality of sensor target features are the apertures 225 detectable by the LIDAR. Alternately, the plurality of sensor target features may be on different targets; for example, the first sensor may be a radar sensor and the first plurality of sensor target features may be the trihedral radar calibration targets 220, while the second sensor may be any other sensor (e.g., camera, lidar) and the second plurality of sensor target features may be, for example, the visual markings (rings) 230 or apertures 225 of the combined extrinsic calibration targets 250, or a pattern 210 of a camera intrinsic target such as the targets 200A-C, or any other target described herein.

At step 1535, the internal computing system 110 of the vehicle 102 compares the relative positioning of the representations of the first plurality of sensor target features and the representations of the second plurality of sensor target features to known relative positioning of the first plurality of sensor target features and the second plurality of sensor target features. In some cases, the relative positioning may be determined based on comparison of a position of a particular point in one representation, such as the center, to a particular point in the another representation to which it is being compared, such as the center. Points that can be used instead of the center may include or the highest point, lowest point, leftmost point, rightmost point, a point that is centered along one axis but not another, a point at the widest portion of the representation, a point at the narrowest portion of the representation, a point at a particular edge or vertex, or some combination thereof. At step 1540, the internal computing system 110 of the vehicle 102 generates a transformation based on the comparison, such that the transformation aligns a first location identified by the first sensor and a second location identified by the second sensor.

As a first example, the first sensor may be a camera and the second sensor may be a LIDAR sensor, and the first plurality of sensor target features and the second plurality of sensor target features may both be features of the combined extrinsic calibration targets 250 of FIGS. 2E and 5 such that the first plurality of sensor target features are the visual markings (rings) 230 detectable by the camera and the second plurality of sensor target features are the apertures 225 detectable by the LIDAR. In such a case, the internal computing system 110 of the vehicle 102 identifies a center of a particular aperture 225 based on the LIDAR data, and identifies a center of a ring 230 based on the camera data, compares these at step 1535 and identifies a relative distance between the two locations based on the internal computing system 110's current geographic understanding of the calibration environment. Because the internal computing system 110 understands that these two points should represent the same location in the real world (i.e., their relative positioning indicates no distance between them), the internal computing system 110 generates a transformation—which may include, for example, a translation along X, Y, and/or Z dimensions, a rotation along any axis, a warp or distortion filter, or some combination thereof—that aligns these location points. That is, the transformation translates (1) a mapping of a point from the one sensor's capture data set to a real world position into (2) a mapping of a point from the other sensor's capture data set to the same real world position. While, with just a pair or two of such points, there may be multiple possible transformations that can perform this alignment, the internal computing system 110 can generate a transformation that works consistently for an increasing number of pairs such sets of points—for example, for each aperture 225 and ring 230 combinations of a target 250, and for each target 250 in the calibration environment. As the number of pairs increases, the number of possible transformations that can successfully align these. Different sensors may map the world around them differently; for example, if the camera includes a wide-angle lens while the other sensor (e.g., LIDAR) does not include an analogous distortion effect, the transformation may include some radial movement or other compensation for distortion.

As a second example, the first sensor may be a radar sensor and the second sensor may be a LIDAR sensor, and the first plurality of sensor target features may be trihedral radar calibration targets 220 while the second plurality of sensor target features may be apertures 225 of a combined target 250 or the planar boundaries of a substrate 205 of a camera target 200, each of which is a known distance away from the nearest trihedral radar calibration targets 220. In such a case, the internal computing system 110 of the vehicle 102 identifies a location of the trihedral radar calibration targets 220 based on radar sensor data and a location of the LIDAR target feature based on LIDAR sensor data, compares these at step 1535 and identifies a relative distance between the two locations based on the internal computing system 110's current geographic understanding of the calibration environment. Because the internal computing system 110 understands that these two points should be a known distance away in a particular direction at a particular angle in the real world, the internal computing system 110 generates a transformation—which may include, for example, a translation along X, Y, and/or Z dimensions, a rotation along any axis, a warp or distortion filter, or some combination thereof—that aligns these location points to match the same known distance away in the particular direction at the particular angle as in the real world. While initially there may be multiple possible transformation that can perform this, the internal computing system 110 can generate a transformation that works consistently for multiple such sets of points—for example, for each trihedral radar calibration target 220 and each nearby LIDAR target feature pair in the calibration environment.

At step 1545, the internal computing system 110 of the vehicle 102 receives, from the first sensor and second sensor, post-calibration sensor capture datasets captured by the first sensor and second sensor after the calibration time period. At step 1550, the internal computing system 110 of the vehicle 102 applies the transformation generated in step 1540 to one or both of the post-calibration sensor capture datasets. For example, a representation of a particular object can be identified in a post-calibration sensor capture dataset captured by one sensor after calibration, and the transformation can be applied to find the same object within another post-calibration sensor capture dataset captured by another sensor after calibration. A real-world position of the same object may be found relative to the vehicle 102 based on intrinsic calibration of at least one of the two sensors and/or based on the transformation. In some cases, a representation of an entire space—that is, a three-dimensional volume—in one post-calibration sensor capture dataset captured by one sensor after calibration may then be identified in another post-calibration sensor capture dataset captured by another sensor by applying the transformation to multiple points within the space. Important points, such as vertices (e.g., corners of a room), edges (e.g., edges of a room), or other features may be selected as at least some of these points. With two aligned representations of a 3-D space, objects can be identified around the vehicle that might not otherwise be. For example, a pedestrian wearing all black might not visually stand out against (e.g., contrast against) a background of an asphalt road at night, but a RADAR or LIDAR might easily identify the pedestrian, and the transformation will still allow the computer 110 of the vehicle 102 to understand where that pedestrian is in its camera footage, allowing the vehicle to pay close attention to visual cues from the pedestrian that the RADAR or LIDAR might not catch or understand, such as presence or lack of a pet or small child accompanying the pedestrian. Developing the vehicle's understanding of its surroundings by aligning real-world (and relative) mappings of the inputs it receives from its sensors can save lives in the field of autonomous vehicles by allowing the best aspects of multiple sensors to complement one another to develop a comprehensive view of the vehicle's surroundings. No sensor is perfect at detecting everything—range sensors can see range/depth but not color or brightness, and can have trouble seeing small or fast-moving objects—while cameras can see color and brightness and visual features but can have trouble with depth perception. Thus, each sensor has its strengths, and the alignment made possible by the extrinsic calibration processes discussed in FIG. 15 can allow the best aspects of each sensor (the "pros" of each sensor) to complement each other and compensate for the downsides of each sensor (the "cons" of each sensor). Note that capture of data by the sensors 180 of the vehicle 102 may occur in parallel with calibration of the sensors 180 of the vehicle 102. While an initial transformation is generated at step 1540, the vehicle 112 may continue to rotate, and its sensors 180 may continue to capture more sensor data, hence the dashed lines extending back up to steps 1505 and 1510 and 1515 from step 1540. When step 1540 is reached a second, third, or $N^{th}$ time (where N is any integer over 1), the transformation generated the first time step 1540 was reached may be updated, revised, and/or re-generated based on the newly captured sensor data when step 1540 is reached again. Thus, the transformation becomes more accurate as calibration continues.

For some additional context on extrinsic calibration, all sensors' extrinsic properties may include relative positions in X, Y, and/or Z dimensions, as well as roll, pitch, and/or yaw. Target and vehicle locations are ground truthed via the mapping system discussed in step 1310 and further as discussed with respect to the transformation of step 1430 of FIG. 14. Sensors of the vehicle 102 and scene surveying system 610 record the scene and each target is detected using a target detection method specific to that sensor and target pair. The measured target location is compared against the mapped target location to derive the total extrinsic sensor error:

$$\text{Extr}_{sensor}(R,t) = \Sigma_{target} \| RC_{target} + t - D_{target} \|^2$$

Where $C_{target}$ is the measured location of the target and $D_{target}$ is the mapped location of the target. We can collect the intrinsic sensor calibration data (as in FIG. 14) in a similar way, at each frame of recorded data the targets are detected and intrinsics are collected. These intrinsic sensor calibration data (as in FIG. 14) might be the measured distance between pixel coordinates and the lines on a target, or lidar point coordinates and detected planar sides of a target. The total error for a single sensor can be summarized as:

$$\text{ExtrIntr}(R,t,\alpha)_{sensor} = \text{Intr}_{sensor}(\alpha) + \gamma_{sensor} \text{Extr}_{sensor}(R,t)$$

The weight $\gamma_{sensor}$ determines the contribution of that sensor's extrinsic parameter. By collecting the ExtrIntr for every sensor we define a global cost function that describes all intrinsics and extrinsics in the system. We can minimize the total expected error by toggling the calibration parameters for each sensor [R,t,α] via a convex optimization algorithm. The output of the sensor extrinsic calibrations may be a pair of rotation and translation matrices on a per sensor basis with respect to the origin of the 3D space (e.g., as identified via LIDAR).

After the calibration parameters are solved for, tests for the numerical sensitivity of the solution can be performed. This may include, for example, verifying the Jacobian of the solution is near zero in all directions and that the covariance of each parameter is reasonably small (e.g., below a threshold). More sophisticated routines that test for sensitivity to targets and constraints may also be performed.

Figure 16:
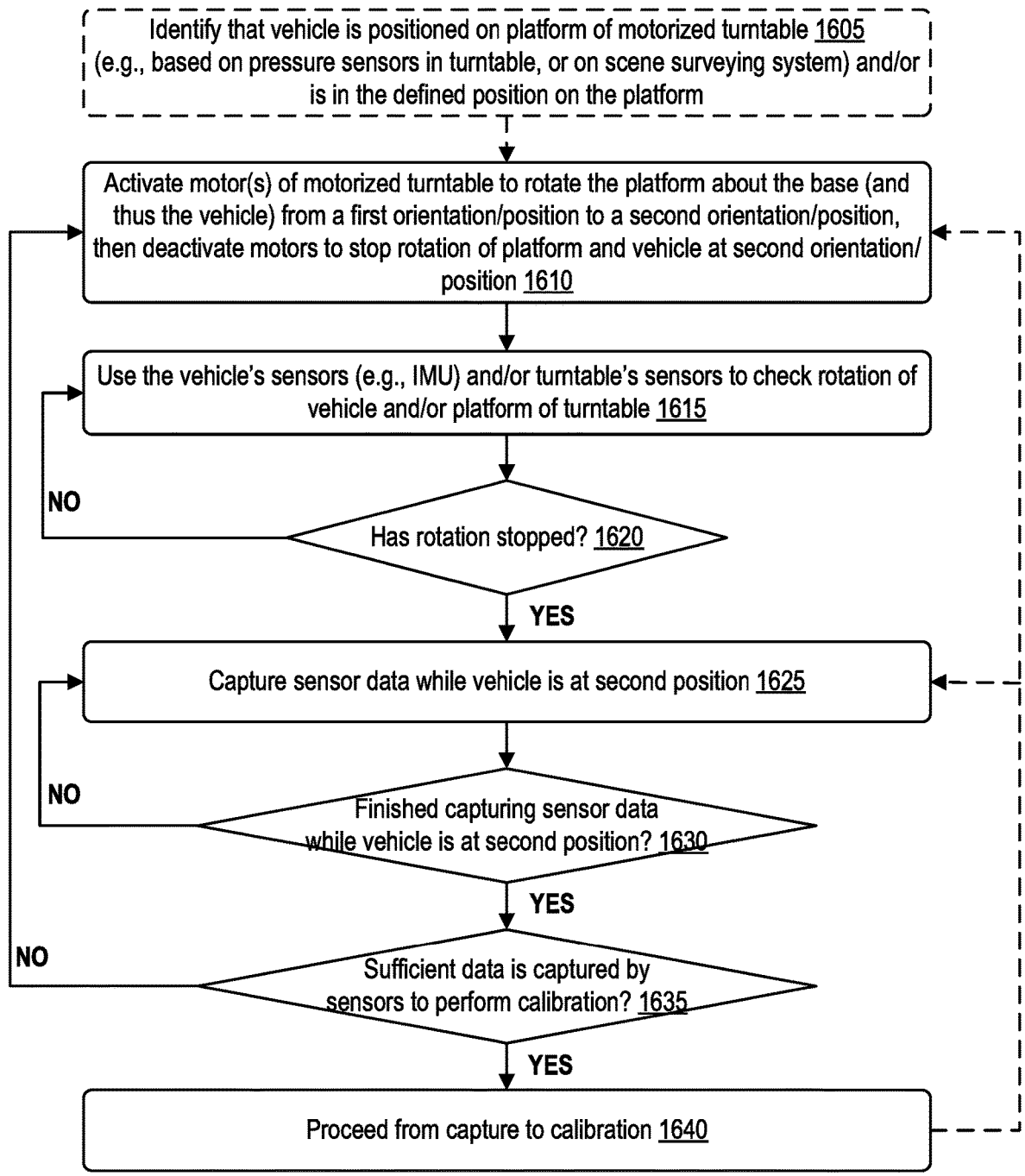
FIG. 16 is a flow diagram illustrating operations for interactions between the vehicle and the turntable.

FIG. 16 is a flow diagram illustrating operations for interactions between the vehicle and the turntable.

At optional step 1605, the turntable 405, vehicle 102, or surveying system 610 identifies that the vehicle 102 is positioned on the platform of the motorized turntable. This may be identified using pressure sensors 735 of the turntable 405, a GNSS or triangulation-based positioning receiver of the vehicle 102 compared to a known location of the turntable 405, image/lidar data captured by the surveying system 610 indicating that the vehicle 102 is positioned on motorized turntable 405, or some combination thereof. In some cases, the pressure sensors 735 may be positioned under or beside the guide railing, for example close behind the "stop" wall or incline, to ensure that the vehicle will apply pressure to them. In other cases, the entire turntable is receptive as a pressure sensor. In any case, this information is communicated to the dynamic scene control bridge 710 and/or the computing device 745 of the turntable system 405, either within the turntable itself (if via sensors 735) or via the relevant transceiver(s) of FIG. 7. In some cases, either sensor data capture by the sensors of the vehicle 102 or rotation of the platform 420 of the motorized turntable 405 may automatically begin once the pressure sensors identify that the vehicle 102 is on the platform 420 and/or once sensors identify that the vehicle 102 has stopped moving (e.g., IMU of the vehicle 102, regional pressure sensors of regions of the turntable platform 420 surface, scene surveying system 610 camera, or some combination thereof). Rotation of the platform 420 about the base 425 may occur first before sensor data capture if, for example, calibration is previously designated to start with the vehicle 102 rotated to a particular rotation orientation or rotation position that is not the same as the rotation orientation or rotation position that the vehicle 102 is in when it drives (or is otherwise placed) onto the platform 420.

In some cases, the rotation of the platform 420 of the turntable 405 about the base 425 via the motors 730 can manually be triggered instead of being based on, and automatically triggered by, detection of the vehicle at step 1605, for example via an input received at the dynamic scene control bridge 710 and/or the computing device 745 of the turntable system 405 from a wired or wireless interface that itself receives an input from a human being, the wired or wireless interface being for example a keyboard or touchscreen or mouse or remote control communicating in a wired or wireless fashion with the dynamic scene control bridge 710 and/or the computing device 745 of the turntable system 405.

At step 1610, one or more motors 730 of the motorized turntable 405 are activated to rotate the platform 420 of the motorized turntable 405 about the base 425 of the motorized turntable 405 (and therefore vehicle 102 on top of the platform 420 as well) from a first rotation orientation to a second rotation orientation in response to detection that the vehicle is on the turntable. The one or more motors 730 may be deactivated, causing the platform of the motorized turntable 405 (and therefore vehicle 102 on top of the platform 420 as well) to stop rotating about the base 425 with the platform 420 in the second orientation at the stop of rotation. The term "rotation orientation" may be used to refer to an angle, or angular orientation, or angular position. Other terms may be used in place of the term "rotation position," such as "angle," "angular position," "angular orientation," "position," or "orientation." The first rotation orientation and the second rotation orientation may be a predetermined angle away from each other, for example N degrees, where N is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or some amount in between any two of these numbers. The first rotation orientation and the second rotation orientation may be an angle away from each other that is determined by the internal computing system 110 of the vehicle 102, or by the dynamic scene control bridge 710, or by the computing device 745 of the turntable system 405, or by some combination thereof, based on which angle would likely be most efficient, comprehensive, or an optimal balance thereof, in completing calibration of the entire fields of view (FOV) of the sensors 180 of the vehicle 102.

At step 1615, the vehicle 102 uses its IMU (or other rotation detection device) to check whether the vehicle 102 (and therefore the platform 420) is still rotating. As the IMU is a collection of accelerometers and/or gyroscopes and/or other motion or rotation detection devices, the vehicle 102 can alternately separately use accelerometers and/or gyroscopes and/or other motion or rotation detection devices that are among the vehicle 102's sensors 180 to determine this. Alternately, the turntable 405 may use one or more motion sensors of its own (e.g., accelerometer, gyroscope, IMU, or any other motion sensor discussed herein) to identify whether the platform 420 of the turntable 405 is still rotating about the base 425. Alternately still, the scene surveying system 610 may use one or more cameras to visually identify whether the platform of the turntable 405 and/or the vehicle 102 is still rotating. In some cases, the device that detects that the vehicle 102 and/or the platform 420 of the turntable 405 has stopped rotating relative to the base 425 (the vehicle computing system 110, the computing device 745 of the turntable 405, the scene surveying system 610, and/or the dynamic scene control bridge 710) can send a signal identifying the detected stop in rotation to any of the vehicle computing system 110, the computing device 745 of the turntable, the scene surveying system 610, or the dynamic scene control bridge 710.

If, at step 1620, the vehicle 102 or turntable 405 or scene surveying system 610 determines that the rotation has stopped, step 1625 follows step 1620. Otherwise, step 1615 follows step 1620.

In addition, we may use the vehicle 102's other sensors 180, such as one or more cameras, radar sensors, lidar sensors, sonar sensors, and/or sodar sensors instead of or in addition to the IMU, accelerometers, gyroscopes, and/or motion/rotation detection devices to identify when the vehicle 102 (and thus the platform 420) is still rotating relative to the base 425 or not. With all of these sensors, rotation may be identified based on whether regions of the calibration environment that should be motionless—walls, the floor, the ceiling, targets that have not been configured and/or commanded to move, light sources 620, the scene surveying system 610—are changing location between sensor captures (indicating that the vehicle is rotating and/or in motion) or are stationary between sensor captures (indicating that the vehicle is stationary).

At step 1625, the vehicle captures sensor data using one or more of its sensors while the vehicle 102 is at the second position. If, at step 1630, the internal computing device 110 of the vehicle 102 determines that it has finished capturing sensor data while vehicle is at the second rotational orientation/position, then step 1635 follows step 1630, and optionally, the vehicle computing system 110 may send a sensor capture confirmation signal to a computing device associated with the turntable 405, such as dynamic scene control bridge 710 and/or the computing device 745 of the turntable system 405. The sensor capture confirmation signal may then be used as a signal that the turntable 405 is allowed to begin (and/or should begin) rotation of the platform 420 about the base 425 from the second rotation orientation to a next rotation orientation. Otherwise, if sensor data capture is not complete step 1625 follows step 1630.

If, at step 1635, the internal computing device 110 of the vehicle 102 determines that sufficient data has been captured by the vehicle 102's sensors 180 to perform calibration—then no more rotations of the platform 420 and the vehicle 102 about the base 425 are needed and step 1640 follows step 1635, thus proceeding from sensor data capture to sensor calibration. Optionally, the vehicle computing system 110 may send a sensor capture completion signal to a computing device associated with the turntable 405, such as dynamic scene control bridge 710 and/or the computing device 745 of the turntable system 405. The sensor capture completion signal may then be used as a signal that the platform 420 of the turntable 405 is allowed to stop (and/or should stop) rotating about the base 425 altogether to allow the vehicle 102 to exit the turntable 405 and the calibration environment, or that the platform 425 of the turntable 405 is allowed to begin (and/or should begin) rotating about the base 425 to an exit orientation that allow the vehicle 102 to exit the turntable and the calibration environment (for example when the calibration environment includes many targets around the turntable 405 except for in an entrance/exit direction, as in FIG. 6 where an optimal entrance/exit direction is on the bottom-right due to lack of targets and obstacles generally in that direction). Otherwise, if the internal computing device 110 of the vehicle 102 does not determine that sufficient data has been captured by the vehicle 102's sensors 180 to perform calibration at step 1635, then step 1610 follows after step 1635, to continue rotations of the platform 420 (and vehicle 102) about the base 425 of the motorized turntable system 405. Depending on the sensors 180 on the vehicle 102 and the data captured by the sensors 180, the sensors 180 may require one or more full 360 degree rotations of the vehicle 102 on the platform 420, or may require less than one full 360 degree rotation of the vehicle 102 on the platform 420. In one embodiment, sufficient data for calibration of a sensor may mean data corresponding to targets covering at least a subset of the complete field of view of a particular sensor (collectively over a number of captures), with the subset reaching and/or exceeding a threshold percentage (e.g., 30%, 35%, 40%, 45%, 50%, 55%, 60%, 65%, 70%, 75%, 80%, 85%, 90%, 95%, 99%, 100%).

Some sensors may require more data for calibration than others, and thus, one sensor may have captured sufficient data for calibration while another sensor might not. In such cases, step 1635 may refer to all sensors and thus go through the "NO" arrow if any of the sensors 180 hasn't captured sufficient data. Alternately, a particular sensor capturing sufficient data, or a majority of sensors capturing sufficient data, may be the deciding factor toward "YES" or "NO." In some cases, step 1635 may refer to each sensor separately, and once a particular sensor has captured sufficient data at step 1635, that sensor may continue on to step 1640 for calibration even if the vehicle 102 on the platform 420 continues to rotate about the base 425 and the remaining sensors continue to capture data. Thus, step 1635 may enable staggered completion of capture of sufficient data for different sensors at different times.

In some cases, sensor data capture and sensor calibration occurs at least partially in parallel; that is, a time period in which sensor data capture occurs may at least partially overlap with a time period in which sensor calibration occurs. In such cases, the sensor may calibrate region by region, for example by calibrating the sensor in one or more regions in which the sensor detects (e.g., "sees") targets for each data capture until the entire point of view of the sensor, or some sufficient subset is calibrated, with the subset reaching and/or exceeding a threshold percentage (e.g., 30%, 35%, 40%, 45%, 50%, 55%, 60%, 65%, 70%, 75%, 80%, 85%, 90%, 95%, 99%, 100%). Calibration of each sensor may use a different threshold, or certain sensors may share a threshold. When calibration occurs in parallel with capture rather than calibration on the whole sequentially following capture on the whole, step 1635 can simply identify when calibration of one or more sensors has successfully completed, and treat that as a proxy for identifying whether sufficient data is captured by those sensors to perform calibration.

In this case, however, step 1610 now rotates the vehicle 102 from the second position to a third position, and steps 1625 and 1630 refer to the third position. The next time step 1610 is reached in this fashion, it now rotates the vehicle 102 from the third position to a fourth position, and so on. In this way, step 1610 rotates the vehicle 102 on the platform 420 about the base 425 from its current rotational orientation/position to its next rotational orientation/position.

At step 1640, the internal computing device 110 of the vehicle 102 proceeds on from sensor data capture to actual calibration of the sensors, for example as in steps 1425-1445 of FIG. 14 or steps 1525-1550 of FIG. 15. To clarify, as discussed further above, capturing data via the sensors 180 as in steps 1625-1635 and calibrating the sensors 180 as in step 1640 can be performed in parallel, between rotations of the platform 420 and vehicle 102 about the base 425, or in any order that causes the process to be efficient. That is, calibration of data captured by a given one of the sensors 180 can begin immediately after the given sensor captures any new data, and can continue while the vehicle 102 is rotating about the base 425 on the platform 420 of the turntable 405 and while the sensors 180 capture further data. Because calibration and capture may be staggered and/or parallelized so that some further capture occurs after some calibration has started, dashed arrows extend from step 1640 to steps 1610 and 1625.

It should be understood that many of the steps of FIG. 16 (such as 1605, 1615, 1620, 1630, and 1635) are optional.

Figure 17A:
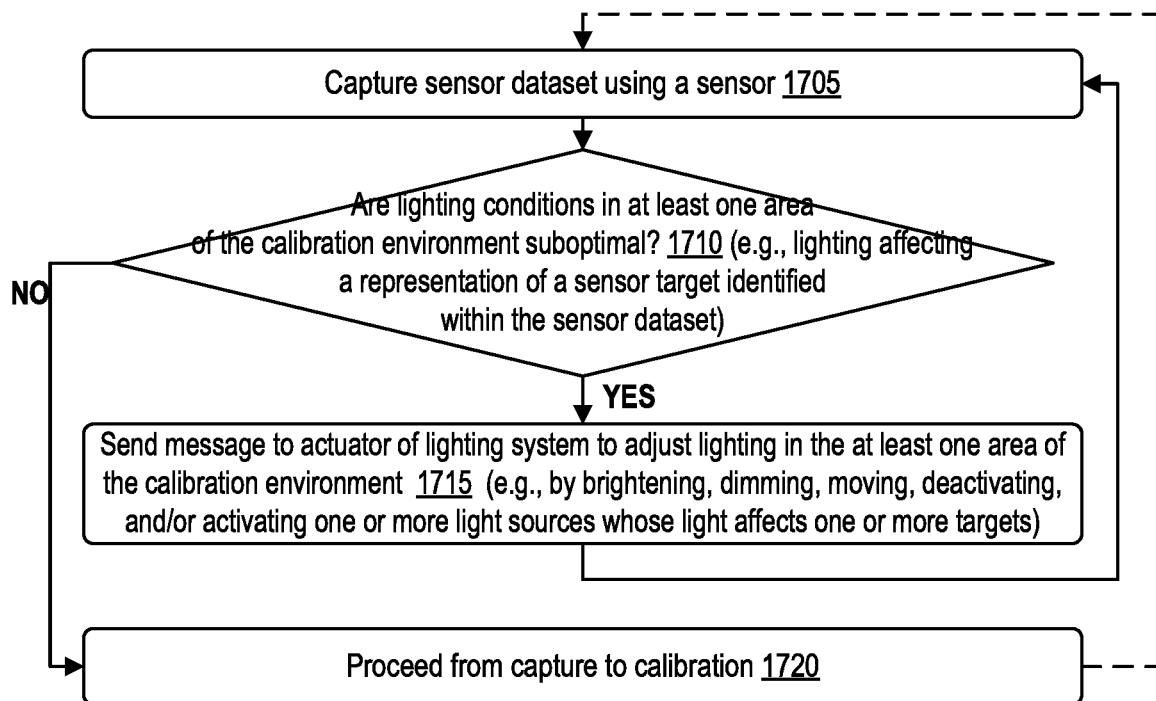
FIG. 17A is a flow diagram illustrating operations for interactions between the vehicle and a lighting system.

FIG. 17A is a flow diagram illustrating operations for interactions between the vehicle and a lighting system.

At step 1705, the vehicle 102 captures sensor datasets using its sensors 180, for example as in steps 1310, 1410, 1510, 1515, and/or 1625. At step 1710, the internal computing system 110 of the vehicle 102 identifies whether a characteristic of one or more sensor targets—in this case lighting conditions in at least one area of the calibration environment that includes one or more sensor targets—are suboptimal, at least for the purposes of calibration. In some cases, the computer 110 of the vehicle 102 may identify that a representation of a sensor target that is identified within a sensor dataset (such as a photo or video) captured using the sensor (such as a camera) is suboptimal or not suitable for calibration, for example because the sensor target is too dimly lit, too brightly lit, or lit from the wrong angle (e.g., causing glare, shadows, dimness, brightness, uneven lighting, or otherwise affecting the representation of the sensor target). Such lighting conditions may be suboptimal because they may cause a sensor to not properly or clearly detect out one or more features of the sensor target, such as a checkerboard pattern 210A or ArUco pattern 210B or crosshair pattern 210C of a camera target 200, or a shape 215 of a radar target 220, or a aperture 225/240 and/or marking 230 and/or target ID 235 of a combined camera/depth sensor target 250.

If, at step 1710, the computer 110 of the vehicle 102 determines that the lighting conditions are suboptimal, then step 1710 is followed by step 1715; otherwise, step 1710 is followed by step 1720, at which point the vehicle proceeds from capture to sensor calibration of its sensors, for example as in steps 1315-1325, 1425-1440, 1525-1550, and/or 1640.

Note that, as discussed with respect to FIG. 16, capture of data by the sensors 180 of the vehicle 102 may occur in parallel with calibration of the sensors 180 of the vehicle 102. This may cause calibration and capture to be staggered and/or parallelized so that some further capture occurs after some calibration has started, represented by the dashed arrow from step 1720 to step 1705.

At step 1715, the internal computing system 110 of the vehicle 102 sends an environment adjustment signal or message to an environment adjustment system (in this case the lighting system 760) to activate one or more actuators 762 and thereby adjust lighting conditions in the at least one area (and affecting one or more sensor targets in the at least one area) of the calibration environment. The one or more actuators 762 may control one or more motors associated with the lighting system 760, one or more switches associated with the lighting system 760, and/or one or more dimmers associated with the lighting system 760. Upon receiving the environment adjustment signal or message from the vehicle 102, the lighting system 760 can activate the one or more actuators 762, and can thereby effect a modification to the characteristic (i.e., the lighting condition) of the one or more sensor targets, for example by brightening one or more light sources 620, by dimming one or more light sources 620, by moving one or more light sources 620 translationally, by rotating one or more light sources 620 (i.e., moving the one or more light sources 620 rotationally), by activating (i.e., turning on) one or more light sources 620, by deactivating (i.e., turning off) one or more light sources 620, by changing a color emitted by (or filtered via color filters applied to) the one or more light sources 620, by otherwise modifying the one or more light sources 620, or some combination thereof. Note that an increase in brightness as discussed herein may refer to brightening one or more light sources 620, activating one or more one or more light sources 620, and/or moving one or more light sources 620. Note that a decrease in brightness as discussed herein may refer to dimming one or more light sources 620, deactivating one or more one or more light sources 620, and/or moving one or more light sources 620. In some cases, the message of step 1715 may be sent to a mobile robot 800 or otherwise to a computer 796 of the robotic scene control system 790, which may cause one or more mobile robot 800 to drive to move one or more light sources 620, or to raise or lower the light sources 620 using the screw or telescopic lifting mechanism, or to interact with a switch or other interface associated with the light source 620 to turn the light source 620 on or off, dim the light source 620, filter the light source 620, or perform any other action discussed with respect to step 1715.

After step 1715, the process returns to 1705 to capture the sensor data with newly-adjusted (i.e., optimized) lighting. The newly-adjusted lighting is then checked at step 1710 to see whether the adjustment from step 1715 corrected the lighting condition issue identified previously at step 1710 (leading to step 1720), or if further adjustments are required (leading to step 1715 once again).

Figure 17B:
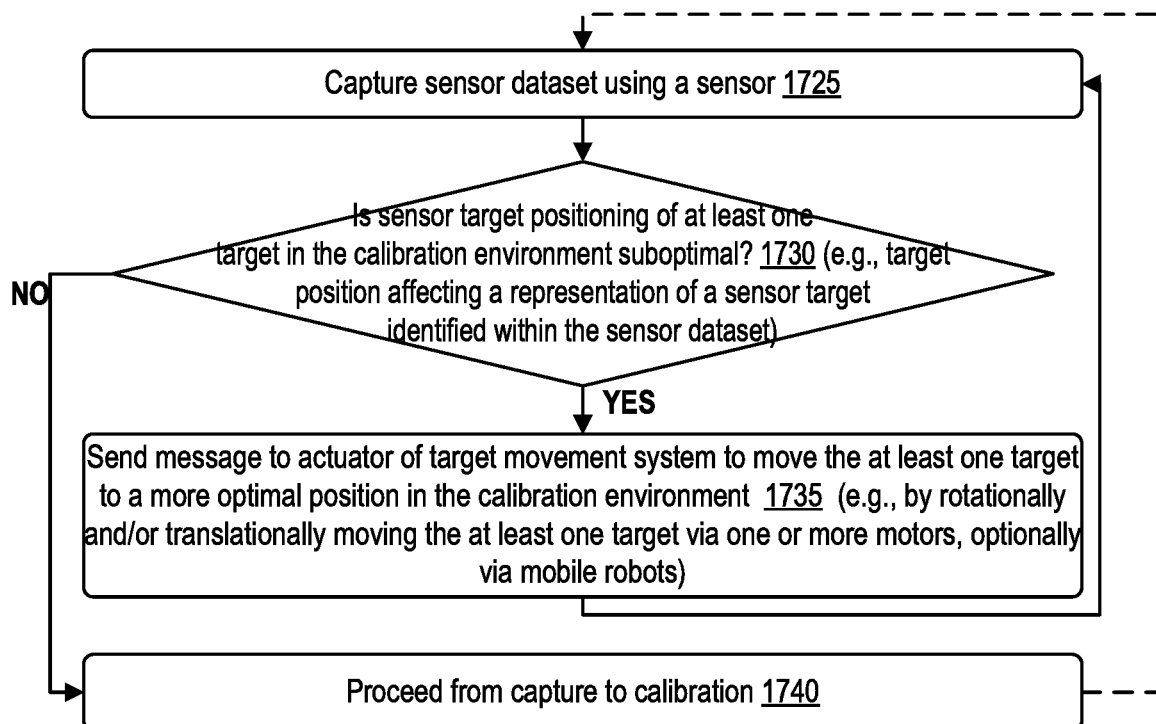
FIG. 17B is a flow diagram illustrating operations for interactions between the vehicle and a target control system.

FIG. 17B is a flow diagram illustrating operations for interactions between the vehicle and a target control system.

At step 1725, the vehicle 102 captures sensor datasets using its sensors 180, for example as in steps 1310, 1410, 1510, 1515, 1625, and/or 1705. At step 1730, the internal computing system 110 of the vehicle 102 identifies whether a characteristic of one or more sensor targets—in this case sensor target positioning of at least one target in the calibration environment is suboptimal, at least for the purposes of calibration. In some cases, the computer 110 of the vehicle 102 may identify that a representation of a sensor target that is identified within a sensor dataset (such as a photo or video or radar image/video or lidar image/video) captured using the sensor (such as a camera or radar or lidar sensor) is suboptimal or not suitable for calibration, for example because the sensor target is located in a position and/or facing an orientation in which the sensor cannot properly or clearly detect out one or more features of the sensor target, such as a checkerboard pattern 210A or ArUco pattern 210B or crosshair pattern 210C of a camera target 200, or a shape 215 of a radar target 220, or a aperture 225/240 and/or marking 230 and/or target ID 235 of a combined camera/depth sensor target 250.

If, at step 1730, the computer 110 of the vehicle 102 determines that the sensor target positioning is sub-optimal, then step 1730 is followed by step 1735; otherwise, step 1730 is followed by step 1740, at which point the vehicle proceeds from capture to sensor calibration of its sensors, for example as in steps 1315-1325, 1425-1440, 1525-1550, 1640, and/or 1720.

Note that, as discussed with respect to FIG. 16, capture of data by the sensors 180 of the vehicle 102 may occur in parallel with calibration of the sensors 180 of the vehicle 102. This may cause calibration and capture to be staggered and/or parallelized so that some further capture occurs after some calibration has started, represented by the dashed arrow from step 1740 to step 1725.

At step 1735, the internal computing system 110 of the vehicle 102 sends an environment adjustment signal or message to an environment adjustment system (in this case the target control system 770 and/or the robotic scene control system 790) to move the at least one sensor target to a more optimal position in the calibration environment, for example using one or more mobile robots 800 of the robotic scene control system 790 and/or by activating one or more actuators 774/792 of the target control system 770 and/or of the robotic scene control system 790. The one or more actuators 774/792 may control one or more motors and/or switches associated with the target control system 770 and/or the robotic scene control system 790. Upon receiving the environment adjustment signal or message from the vehicle 102, the target control system 770 and/or the robotic scene control system 790 can activate the one or more actuators 774/792, and can thereby effect a modification to the characteristic (i.e., the location around the turntable, rotation about one or more axes, height above the surface that the turntable rests on) of the one or more sensor targets, for example by activating one or more mobile robots 800 to drive and therefore that translationally move one or more targets and/or by activating one or more mobile robots 800 to raise or lower a target higher or lower and/or by activating one or more motors of a mobile robot 800 or target control system 770 that rotate one or more targets about one or more axes.

After step 1735, the process returns to 1725 to capture the sensor data with newly-moved (i.e., optimized) sensor target positioning. The newly-moved target positioning is then checked at step 1730 to see whether the adjustment from step 1735 corrected the target positioning issue identified previously at step 1730 (leading to step 1740), or if further adjustments are required (leading to step 1735 once again).

In some cases, the adjustment(s) to lighting of FIG. 17A and the adjustment(s) to target positioning of FIG. 17B may both occur following capture of the same sensor dataset with the same sensor. In such cases, the checks of steps 1710 and 1730 may be performed repeatedly, once after each adjustment in either target positioning or lighting, since movement of a sensor target may correct or ameliorate issues with lighting, and on the other hand, adjustment of lighting may also correct or ameliorate issues with target positioning. In such cases, the sending of messages, and the resulting adjustments, of steps 1715 and step 1735, can either be performed sequentially (and then tested at steps 1710 and/or 1730), or can be performed in parallel (and then tested at steps 1710 and/or 1730).

While various flow diagrams provided and described above, such as those in FIGS. 13, 14, 15, 16, 17A, and 17B, may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system #00 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices, for example by encrypting such information.

FIG. 18 shows an example of computing system 1800, which can be for example any computing device making up internal computing system 110, remote computing system 150, (potential) passenger device executing rideshare app 170, or any component thereof in which the components of the system are in communication with each other using connection 1805. Connection 1805 can be a physical connection via a bus, or a direct connection into processor 1810, such as in a chipset architecture. Connection 1805 can also be a virtual connection, networked connection, or logical connection.

In some embodiments, computing system 1800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1800 includes at least one processing unit (CPU or processor) 1810 and connection 1805 that couples various system components including system memory 1815, such as read-only memory (ROM) 1820 and random access memory (RAM) 1825 to processor 1810. Computing system 1800 can include a cache of high-speed memory 1812 connected directly with, in close proximity to, or integrated as part of processor 1810.

Processor 1810 can include any general purpose processor and a hardware service or software service, such as services 1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms known to those of skill in the art. In some instances, multimodal systems can enable a user to provide multiple types of input/output to communicate with computing system 1800. Computing system 1800 can include communications interface 1840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1840 may also include one or more Global Navigation Satellite System (GNSS) receivers or transceivers that are used to determine a location of the computing system 1800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1830 can include software services, servers, services, etc., that when the code that defines such software is executed by the processor 1810, it causes the system to perform a function. In some embodiments, a hardware service that performs a particular function can include the software component stored in a computer-readable medium in connection with the necessary hardware components, such as processor 1810, connection 1805, output device 1835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for robotically configuring a vehicle calibration environment, the system comprising:
    a turntable having a platform that is rotatable about a base of the turntable, wherein the base is positioned on a surface, wherein the platform is configured to support a vehicle and to rotate the vehicle during a calibration procedure during which one or more sensors of the vehicle are calibrated based on detection of a plurality of sensor targets by the one or more sensors of the vehicle;

the plurality of sensor targets, wherein, during the calibration procedure, each of the plurality of sensor targets are positioned within a predetermined range of the turntable;

a first mobile robot coupled to a first sensor target of the plurality of sensor targets, wherein the first mobile robot automatically drives along the surface into a first position within the predetermined range of the turntable and automatically actuates a first actuator to move the first sensor target to a first height before the calibration procedure begins;

a second mobile robot coupled to a second sensor target of the plurality of sensor targets, wherein the second mobile robot drives along the surface into a second position within the predetermined range of the turntable and automatically actuates a second actuator to move the second sensor target to a second height before the calibration procedure begins; and one or more computing devices that verify that the plurality of sensor targets are positioned at respective correct calibration positions and respective correct calibration heights before the calibration procedure begins based on vehicle sensor data from a vehicle sensor of the vehicle and on communication of one or more wireless signals between the first mobile robot and the second mobile robot, wherein the vehicle sensor data includes one or more representations of one or more areas that include the respective correct calibration positions and respective correct calibration heights.

2. The system of claim 1, wherein the first mobile robot adjusts a height of the first sensor target before the calibration procedure based on a height of one or more sensors of the vehicle.

3. The system of claim 2, wherein the first mobile robot adjusts the height of the first sensor target by rotating a screw mechanism with a motor.

4. The system of claim 2, wherein the first mobile robot adjusts the height of the first sensor target using an actuated telescoping mechanism.

5. The system of claim 1, wherein the first mobile robot identifies the first position by identifying a position of the first mobile robot relative to a position of the second mobile robot based on the communication of the one or more wireless signals between the first mobile robot and the second mobile robot.

6. The system of claim 1, wherein the second mobile robot identifies the second position by identifying a position of the second mobile robot relative to a position of the first mobile robot based on the communication of the one or more wireless signals between the second mobile robot and the first mobile robot.

7. The system of claim 1, wherein the first mobile robot is coupled to the first sensor target through a mounting portion of the first sensor target, wherein each of the one or more sensor targets include the mounting portion.

8. The system of claim 1, wherein the first mobile robot receives feedback from the vehicle, wherein the first mobile robot actuates a first motor of the first mobile robot in response to receipt of the feedback, wherein the first mobile robot modifies a position of the first sensor target by actuating the first motor.

9. The system of claim 1, wherein the first mobile robot drives along the surface from the first position to a charging position after the calibration procedure, wherein a charging device charges a battery of the first mobile robot while the first mobile robot is in the charging position.

10. A system for configuring a vehicle calibration environment, the system comprising:

a turntable having a platform that is rotatable about a base of the turntable, wherein the base is positioned on a surface, wherein the platform is configured to support a vehicle and to rotate the vehicle during a calibration procedure during which one or more sensors of the vehicle are calibrated based on detection of a plurality of sensor targets by the one or more sensors of the vehicle;

the plurality of sensor targets, wherein each sensor target of the plurality of sensor targets are positioned within a predetermined range of the turntable during the calibration process, wherein the plurality of sensor targets are moved into respective calibration positions within the predetermined range of the turntable by a plurality of mobile robots that drive along the surface to the respective calibration positions before the calibration procedure and in response to transmission of one or more wireless setup signals to the plurality of mobile robots, wherein the plurality of sensor targets are moved into respective calibration heights based on the plurality of mobile robots actuating respective actuators before the calibration procedure and in response to transmission of the one or more wireless setup signals to the plurality of mobile robots; and one or more computing devices that receive a setup command before the calibration procedure, wherein the one or more computing devices transmit the one or more wireless setup signals to the plurality of mobile robots in response to receipt of the setup command, wherein the one or more computing devices verify that the plurality of sensor targets are positioned at respective correct calibration positions and respective correct calibration heights before the calibration procedure begins based on vehicle sensor data from a vehicle sensor of the vehicle and on communication of one or more wireless signals between at least two of the plurality of mobile robots, wherein the vehicle sensor data includes one or more representations of one or more areas that include the respective correct calibration positions and respective correct calibration heights.

11. The system of claim 10, wherein each sensor target of the plurality of sensor targets is coupled to a mobile robot of the plurality of mobile robots during the calibration procedure and while the plurality of sensor targets are being moved by the plurality of mobile robots into the respective calibration positions and respective calibration heights.

12. The system of claim 10, wherein each sensor target of the plurality of sensor targets includes a base that is lifted up by a mobile robot of the plurality of mobile robots.

13. The system of claim 10, wherein one or more computing devices receive a takedown command after the calibration procedure, wherein the one or more computing devices transmit one or more wireless takedown signals to the plurality of mobile robots in response to receipt of the takedown command, wherein the plurality of sensor targets are moved from the respective calibration positions to respective storage positions by the plurality of mobile robots in response to transmission of the one or more wireless takedown signals to the plurality of mobile robots.

14. A method for configuring a vehicle calibration environment, the method comprising:

receiving a setup command at one or more computing devices;

transmitting one or more wireless setup signals from the one or more computing devices to a plurality of one or more mobile robots in response to receipt of the setup command, causing the plurality of one or more mobile robots to drive along a surface to move a plurality of one or more sensor targets into respective calibration positions within a predetermined range of a turntable and to actuate respective actuators to move the plurality of sensor targets to respective calibration heights;

receiving one or more setup confirmation signals at the one or more computing devices from the plurality of mobile robots, the one or more setup confirmation signals indicating that the plurality of mobile robots have moved the plurality of sensor targets;

verifying that the plurality of sensor targets are positioned at respective correct calibration positions and respective correct calibration heights based on vehicle sensor data from a vehicle sensor of a vehicle and on communication of wireless signals between at least two of the plurality of mobile robots, wherein the vehicle sensor data includes one or more representations of one or more areas that include the respective correct calibration positions and respective correct calibration heights; and initiating a calibration procedure after receiving the one or more setup confirmation signals from the plurality of mobile robots and after verifying that the plurality of sensor targets are positioned at respective correct calibration positions and respective correct calibration heights, wherein the turntable is positioned on the surface and is configured to support the vehicle and to rotate the vehicle during the calibration procedure, wherein one or more sensors of the vehicle are calibrated during the calibration procedure based on detection of the plurality of sensor targets by the one or more sensors of the vehicle.

15. The method of claim 14, further comprising:
receiving a takedown command at the one or more computing devices after the calibration procedure;
transmitting one or more wireless takedown signals from the one or more computing devices to the plurality of mobile robots in response to receipt of the takedown command, causing the plurality of mobile robots to move the plurality of sensor targets from the respective calibration positions within the predetermined range of the turntable to respective storage positions; and receiving one or more takedown confirmation signals at the one or more computing devices from the plurality of mobile robots, indicating that the plurality of mobile robots have moved the plurality of sensor targets from the respective calibration positions to the respective storage positions.

16. The method of claim 14, further comprising:
receiving an adjustment request at the one or more computing devices, the adjustment request associated with a first sensor target of the plurality of sensor targets;

identifying a first mobile robot of the plurality of mobile robots such that the first mobile robot is coupled to the first sensor target;

transmitting a wireless adjustment signal to the first mobile robot, the wireless adjustment signal requesting that the first mobile robot move the first sensor target from a first sensor target position to a second sensor target position; and receiving an adjustment confirmation signal at the one or more computing devices from the first mobile robot, the adjustment confirmation signal indicating that the first mobile robot has moved the first sensor target from the first sensor target position to the second sensor target position.

17. The method of claim 16, wherein the wireless adjustment signal requests that the first mobile robot drive along the surface from a first mobile robot position to a second mobile robot position in order to move the first sensor target from the first sensor target position to the second sensor target position.

18. The method of claim 16, wherein the first sensor target position corresponds to a first height of the first sensor target and the second sensor target position corresponds to a second height of the first sensor target, wherein the wireless adjustment signal requests that the first mobile robot adjust a degree of extension of an extendable mechanism using an actuator of the first mobile robot in order to move the first sensor target from the first height to the second height.

19. The method of claim 16, wherein the adjustment request is received from the vehicle.

* * * * *